(12) United States Patent
Suzuki et al.

(10) Patent No.: US 10,915,220 B2
(45) Date of Patent: Feb. 9, 2021

(54) INPUT TERMINAL DEVICE AND OPERATION INPUT METHOD

(71) Applicant: MAXELL, LTD., Kyoto (JP)

(72) Inventors: Motoyuki Suzuki, Oyamazaki (JP);
Yasunobu Hashimoto, Oyamazaki (JP);
Nobuo Masuoka, Oyamazaki (JP);
Hiroshi Shimizu, Oyamazaki (JP);
Kazuhiko Yoshizawa, Oyamazaki (JP);
Mitsunobu Watanabe, Oyamazaki (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 15/766,839

(22) PCT Filed: Oct. 14, 2015

(86) PCT No.: PCT/JP2015/079052
§ 371 (c)(1),
(2) Date: Apr. 9, 2018

(87) PCT Pub. No.: WO2017/064771
PCT Pub. Date: Apr. 20, 2017

(65) Prior Publication Data
US 2018/0292970 A1    Oct. 11, 2018

(51) Int. Cl.
*G06F 3/0481*    (2013.01)
*G06F 3/042*    (2006.01)
(Continued)

(52) U.S. Cl.
CPC .......... *G06F 3/04812* (2013.01); *G06F 1/163* (2013.01); *G06F 3/018* (2013.01);
(Continued)

(58) Field of Classification Search
CPC . G06F 2203/04101; G06F 1/163; G06F 3/044
See application file for complete search history.

(56) References Cited

U.S. PATENT DOCUMENTS 5,793,360 A    8/1998    Fleck et al.
8,624,836 B1    1/2014    Miller et al.
(Continued)

FOREIGN PATENT DOCUMENTS

JP    09/6519 A    1/1997
JP    2004-341892 A    12/2004
(Continued)

OTHER PUBLICATIONS

International Search Report of PCT/JP2015/079052 dated Dec. 8, 2015.
(Continued)

*Primary Examiner* — William L Bashore
*Assistant Examiner* — Nathan K Shrewsbury
(74) *Attorney, Agent, or Firm* — Mattingly & Malur, PC

(57) ABSTRACT

This input terminal device 1 for receiving a user operation via a position input object PS is provided with: a position detection unit 106 which detects the position of the position input object; a display unit 109a which displays a cursor; and an operation processing control unit 1024 which causes operation processing to be performed. The operation processing control unit has a plurality of operation modes and one of these modes includes a state M0 in which the operation processing control unit does not cause any operation processing to be performed, except for movement of the cursor in accordance with the position of the position input object. The operation processing control unit is configured to switch between the plurality of operation modes when the user has performed a specific operation by means of the position input object.

8 Claims, 24 Drawing Sheets

(51) Int. Cl.
*G06F 3/01* (2006.01)
*G06F 3/0488* (2013.01)
*G06F 1/16* (2006.01)
*G06F 3/041* (2006.01)
*G06F 3/044* (2006.01)
*G06F 40/171* (2020.01)

(52) U.S. Cl.
CPC .............. *G06F 3/042* (2013.01); *G06F 3/044* (2013.01); *G06F 3/0412* (2013.01); *G06F 3/0488* (2013.01); *G06F 3/04883* (2013.01); *G06F 40/171* (2020.01); *G06F 2203/04101* (2013.01)

(56) References Cited

U.S. PATENT DOCUMENTS

| | | | |
|---|---|---|---|
| 9,727,131 B2* | 8/2017 | Lim | G06F 1/1647 |
| 9,798,462 B2* | 10/2017 | Kameyama | G06F 3/041 |
| 9,933,833 B2* | 4/2018 | Tu | G06F 1/3296 |
| 9,965,033 B2* | 5/2018 | Park | G06F 3/014 |
| 10,067,610 B2* | 9/2018 | Kim | G06F 3/0425 |
| 2002/0015024 A1* | 2/2002 | Westerman | G06F 3/04815 345/173 |
| 2004/0227741 A1 | 11/2004 | Koda et al. | |
| 2010/0289740 A1* | 11/2010 | Kim | G04G 21/04 345/157 |
| 2011/0093778 A1* | 4/2011 | Kim | G06F 3/04815 715/702 |
| 2011/0248958 A1* | 10/2011 | Gruhlke | G06F 3/0416 345/175 |
| 2013/0100020 A1* | 4/2013 | Salsman | G06F 3/042 345/158 |
| 2013/0147793 A1* | 6/2013 | Jeon | G06F 3/011 345/419 |
| 2013/0194174 A1 | 8/2013 | Bondan et al. | |
| 2014/0189579 A1* | 7/2014 | Rimon | G06F 3/04883 715/784 |
| 2014/0225829 A1* | 8/2014 | Miyazaki | G06F 3/0488 345/157 |
| 2014/0320430 A1* | 10/2014 | Takeda | G06F 3/044 345/173 |
| 2014/0359525 A1* | 12/2014 | Weiner | G06F 3/0485 715/782 |
| 2015/0042603 A1* | 2/2015 | Takano | G06F 3/0414 345/174 |
| 2015/0062033 A1* | 3/2015 | Ishihara | G06F 3/04883 345/173 |
| 2015/0153951 A1* | 6/2015 | Kim | G06F 3/0488 715/773 |
| 2015/0199030 A1* | 7/2015 | Mikkola | H04N 21/41407 345/157 |
| 2015/0205358 A1* | 7/2015 | Lyren | G06F 3/04883 715/765 |
| 2015/0220299 A1* | 8/2015 | Kim | G06F 3/013 345/1.3 |
| 2015/0227252 A1* | 8/2015 | Ivanov | G06F 3/0446 345/174 |
| 2015/0253858 A1* | 9/2015 | Koukoumidis | G06F 3/0488 345/156 |
| 2015/0296062 A1* | 10/2015 | Lee | H01L 51/5293 455/566 |
| 2015/0301719 A1* | 10/2015 | Shinde | G06F 3/04842 715/808 |
| 2015/0309535 A1* | 10/2015 | Connor | A61B 5/4875 361/679.03 |
| 2015/0309663 A1* | 10/2015 | Seo | G06F 3/0421 345/175 |
| 2015/0338916 A1* | 11/2015 | Priyantha | G06F 1/163 345/173 |
| 2015/0358614 A1* | 12/2015 | Jin | H04N 13/296 348/49 |
| 2016/0011668 A1* | 1/2016 | Gilad-Bachrach | G06F 3/0416 345/156 |
| 2016/0026272 A1* | 1/2016 | Park | G06F 3/03545 345/173 |
| 2016/0034041 A1* | 2/2016 | Shin | G06F 3/017 345/156 |
| 2016/0293085 A1* | 10/2016 | Herranz | G09G 5/02 |
| 2017/0123592 A1* | 5/2017 | Nakao | G06F 3/04886 |
| 2017/0168630 A1* | 6/2017 | Khoshkava | G06F 3/044 |
| 2017/0351338 A1* | 12/2017 | Bondan | G06F 3/005 |
| 2017/0364198 A1* | 12/2017 | Yoganandan | G06F 3/04845 |
| 2018/0154212 A1* | 6/2018 | Park | G16H 40/67 |

FOREIGN PATENT DOCUMENTS

| | | |
|---|---|---|
| JP | 2013-425217 A | 3/2013 |
| JP | 2013-73530 A | 4/2013 |
| JP | 2014-106765 A | 6/2014 |

OTHER PUBLICATIONS

Japanese Office Action received in corresponding Japanese Application No. 2019-186454 dated Nov. 4, 2020.

* cited by examiner

F I G. 1A
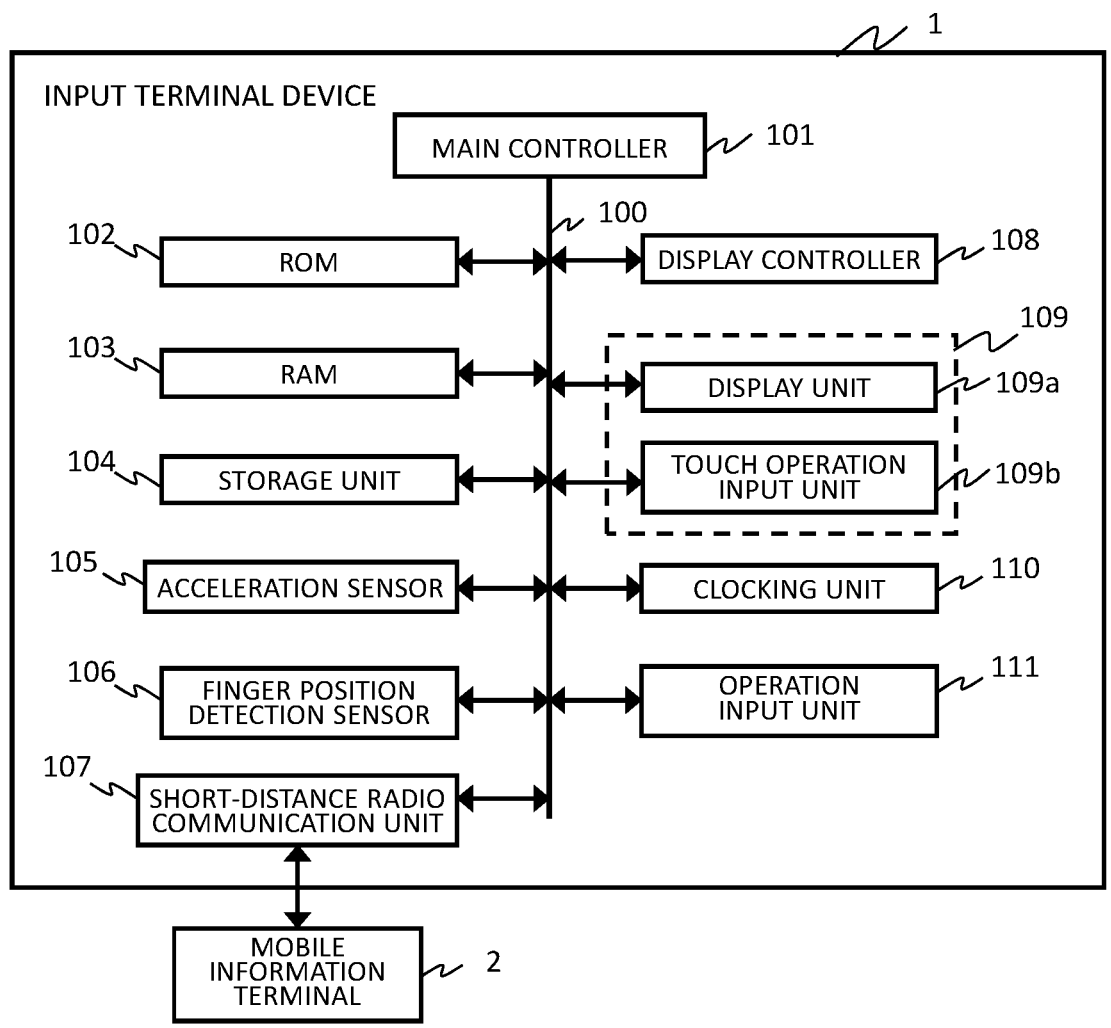

FIG. 6
| OPERATION MODE | CURSOR DISPLAY |
|---|---|
| M0: SUSPEND DRAWING |  |
| M1: EXECUTE DRAWING |  |

DETAILS OF S605

F I G. 1 1
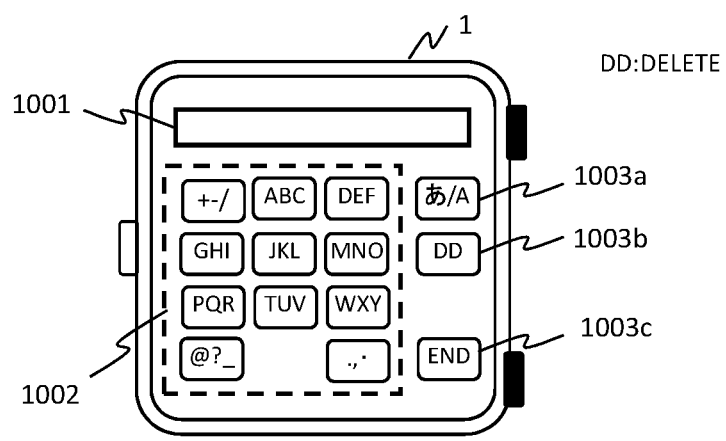

DETAILS OF S1105

F I G. 1 5
| OPERATION MODE | CURSOR DISPLAY |
|---|---|
| M0: DURING NON-OPERATION |  |
| M1: CLICK PROCESS |  |
| M2: DOUBLE CLICK PROCESS |  |
| M3: DRAG PROCESS START |  |
| M4: DRAG PROCESS END |  |
| M5: DROP PROCESS |  |

F I G. 1 6
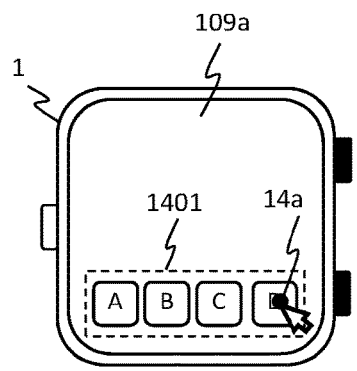
(S1) M0
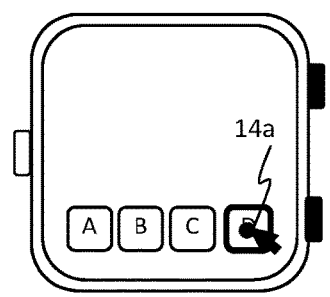
(S2) M1
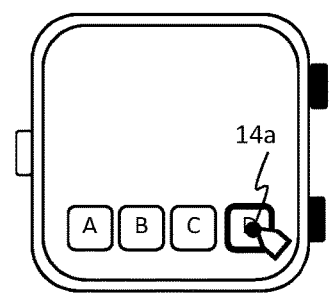
(S3) M2
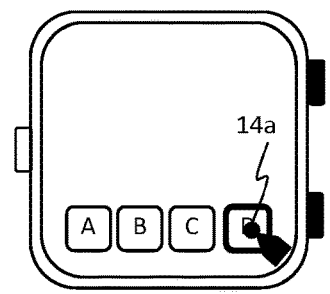
(S4) M3
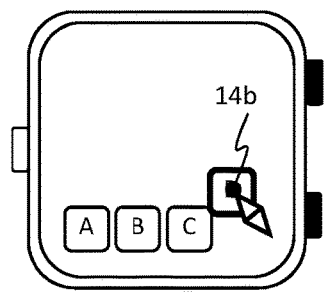
(S5) M4
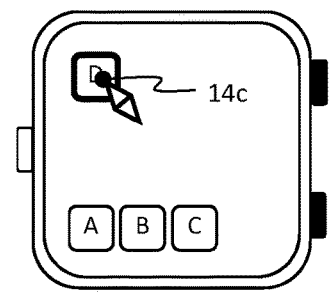
(S6) M5
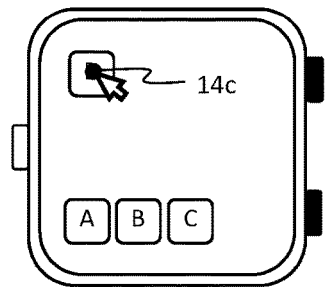
(S7) M0

FIG. 22
DD:DELETE
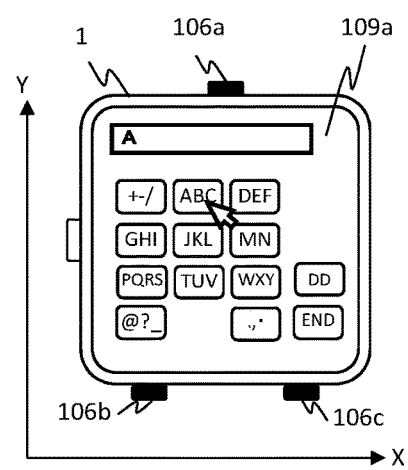
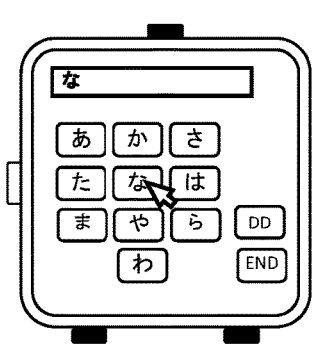
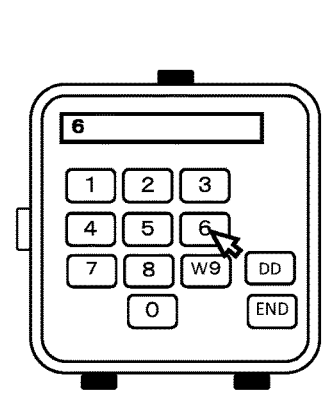
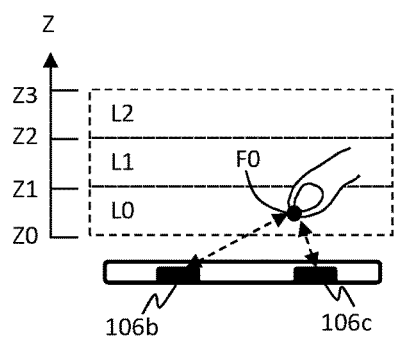
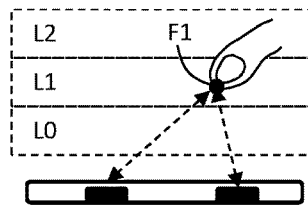
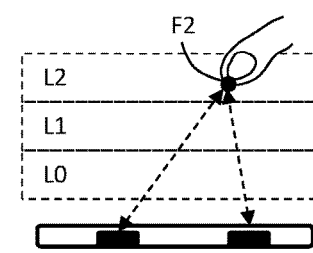
(S1)　　　　　　　　　(S2)　　　　　　　　　(S3)

FIG. 23
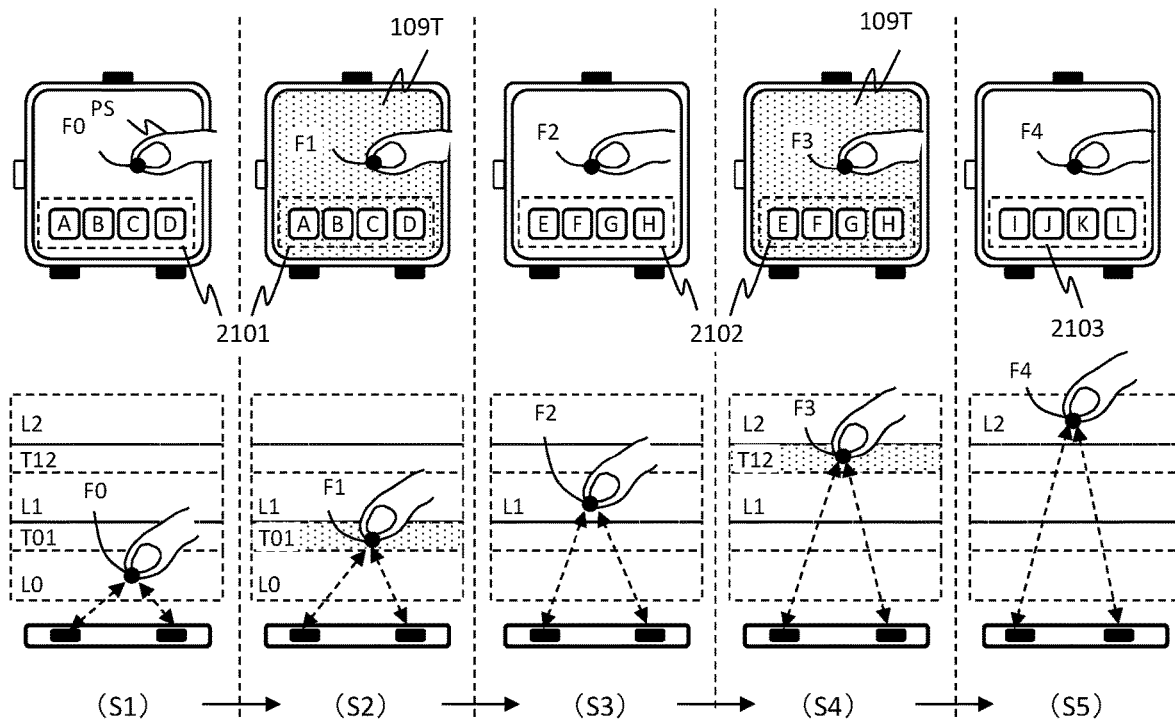
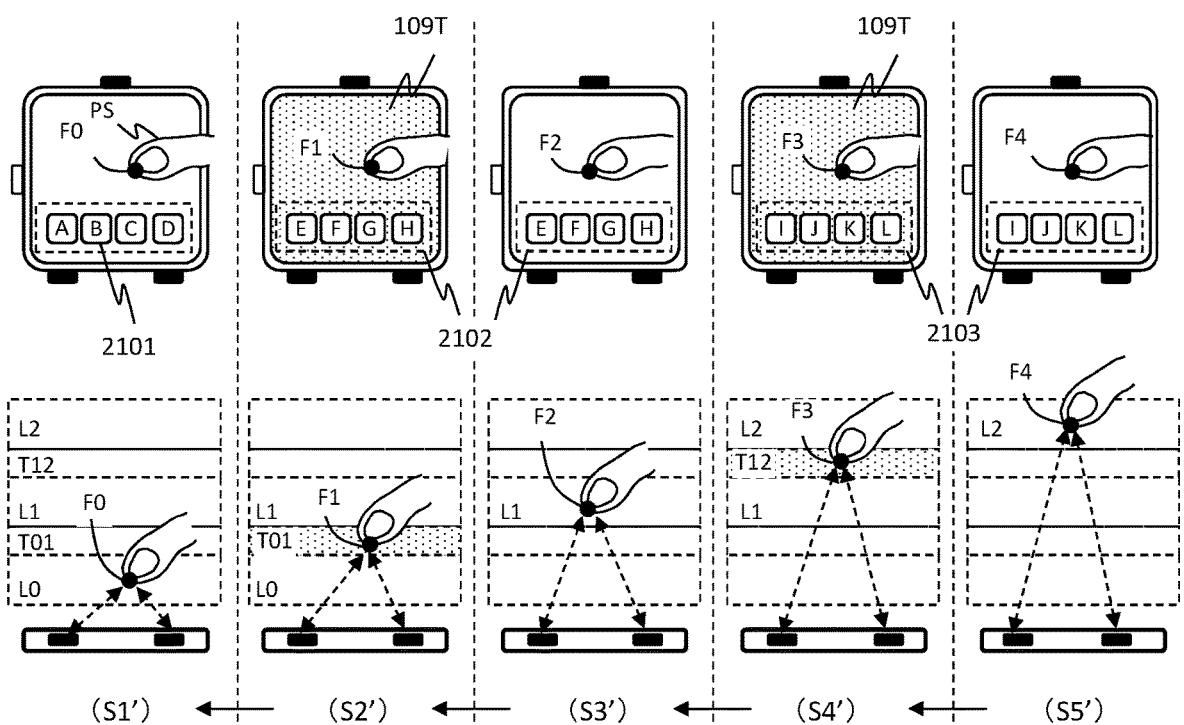

INPUT TERMINAL DEVICE AND OPERATION INPUT METHOD

TECHNICAL FIELD

The present invention relates to a small input terminal device used by being worn on a wrist, etc. and an operation input method.

BACKGROUND ART

In recent years, a mobile information terminal such as a smartphone that performs processing such as retrieval of various information, transmission/reception of mails, management of schedule, etc., in addition to a call has been rapidly spreading. However, the mobile information terminal is stored in a bag or a pocket at the time of movement in many cases. Further, the mobile information terminal needs to be taken out from the bag or the pocket each time to confirm a received mail. For this reason, a small input terminal device such as a wrist watch connected to the mobile information terminal by wireless communication has been developed.

In a mobile information terminal such as a smartphone, information display and finger input may be performed using a touch panel. However, in a small input terminal device, a touch panel is small, and thus it is difficult to perform fine operation input by touch of a finger. For this reason, a non-contact input scheme using a back of a hand of a user as an input surface has been proposed.

For example, in a wristband type input device described in Patent Document 1, a light emitting portion and a light receiving portion are provided in a main body, and a position of a fingertip on a back of a hand or a palm is detected in a non-contact manner so that a character can be input.

CITATION LIST

Patent Document

Patent Document 1: JP 2014-106765 A

SUMMARY OF THE INVENTION

Problems to be Solved by the Invention

In a conventional character input method using a touch panel, etc., input may be performed by distinguishing between a valid period and an invalid period of input such that a character is drawn according to movement of a finger of a user when the finger is in contact with a panel surface and drawing is not performed when the finger is away from the panel surface. In this way, when a character including a plurality of "strokes" such as a line segment, a point, etc. is input, it is possible to correctly input a desired character by distinguishing between a valid "stroke" part and an invalid part moving between a "stroke" and a "stroke".

On the other hand, in a non-contact input method of Patent Document 1, etc., a plurality of grid points on the back of the hand passed by a fingertip is detected, and a character input from dot matrix information is recognized. However, with regard to a passing position of the fingertip, a valid part for a "stroke" included in a character and an invalid part moving between a "stroke" and a "stroke" are not distinguished from each other. That is, there is a problem that an input character is easily erroneously recognized by detecting an invalid part irrelevant to a "stroke" as a part of a character. In other words, a start point and an end point of character drawing are unclear. Even when this invalid part is expected in advance and excluded, in a case in which an order of writing is different at the time of input or in a case in which a character including a sonant mark or a character having a lot of strokes is input, a trajectory of an ineffective part is not fixed, and thus it is considered that erroneous input may not be avoided.

An object of the invention is to provide an input terminal device that performs correct processing according to an intended input operation without responding to an invalid operation of finger movement when a position of a finger is detected without contact to perform an input operation.

Solutions to Problems

The invention is an input terminal device for inputting an operation of a user through a position input object, including a position detection unit that detects a position of the position input object operated by the user without contact, a display unit that displays a cursor on the basis of a position detected by the position detection unit, and an operation processing control unit that executes a corresponding operation process on the basis of the position detected by the position detection unit, wherein the operation processing control unit has a plurality of operation modes related to execution of the operation process, and one of the operation modes has a state in which any operation process except for movement of the cursor according to the position of the position input object is not executed, and the operation processing control unit switches between the plurality of operation modes when the user performs a specific operation through the position input object.

In addition, the invention is an operation input method of inputting an operation of a user through a position input object, including a position detection step of detecting a position of the position input object operated by the user without contact, a display step of displaying a cursor on a display unit on the basis of the position detected in the position detection step, and an operation process step of executing a corresponding operation process on the basis of the position detected in the position detection step, wherein the operation process step has a plurality of operation modes related to execution of the operation process, and one of the operation modes has a state in which any operation process except for movement of the cursor according to the position of the position input object is not executed, and the operation process step switches between the plurality of operation modes when the user performs a specific operation through the position input object.

Effects of the Invention

According to the invention, it is possible to provide an input terminal device that performs correct processing according to an intended input operation without responding to an invalid operation of finger movement when a position of a finger is detected without contact to perform an input operation.

BRIEF DESCRIPTION OF THE DRAWINGS

FIG. 1A is a block diagram illustrating a configuration of an input terminal device (Embodiment 1).

FIG. 6 is a diagram illustrating an example of an operation mode and cursor display corresponding thereto.

FIG. 11 is a diagram illustrating a configuration of a display unit for key character input processing (Embodiment 2).

FIG. 15 is a diagram illustrating an example of an operation mode and cursor display used in mouse operation input processing (Embodiment 3).

FIG. 16 is a diagram illustrating an example of screen display in mouse operation input processing.

FIG. 22 is a diagram illustrating an example of screen display in key character input processing.

FIG. 23 is a diagram illustrating an example of screen display in a case in which a transition region is provided between layers (Embodiment 5).

MODE FOR CARRYING OUT THE INVENTION

Figure 1B:
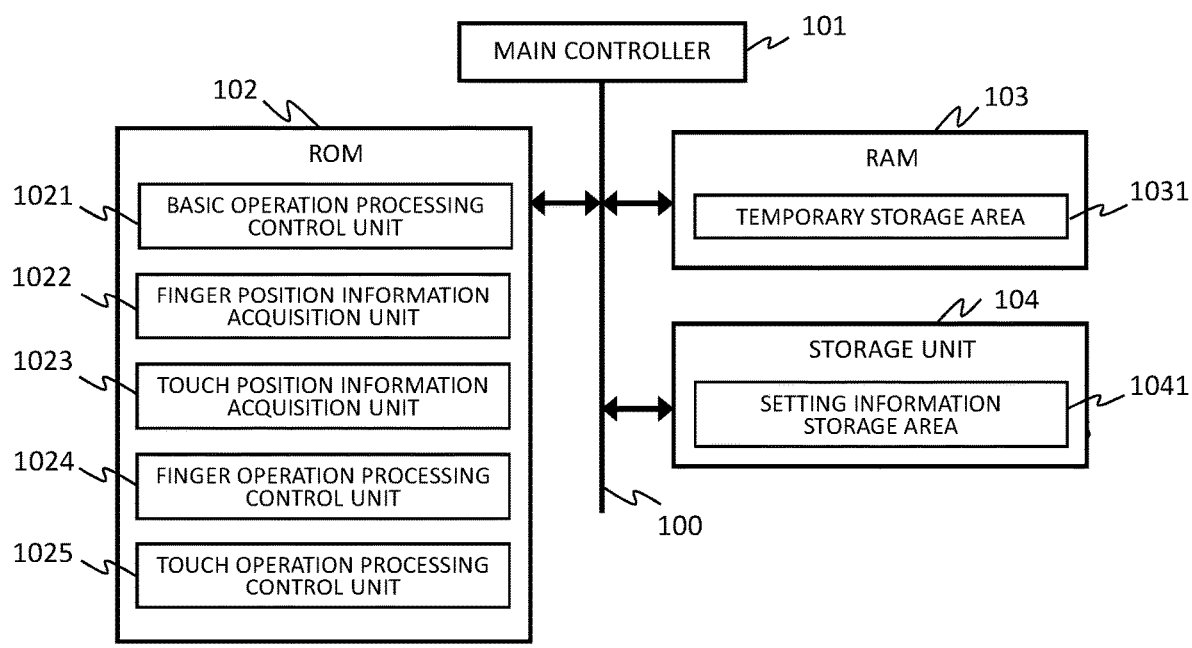
FIG. 1B is a diagram illustrating an example of a software configuration of the input terminal device.

Hereinafter, embodiments of the invention will be described with reference to drawings.

Embodiment 1

In Embodiment 1, a description will be given of a configuration of an input terminal device and a case in which a finger position is detected and a handwritten character is input.

FIG. 1A is a block diagram illustrating a configuration of an input terminal device 1 according to Embodiment 1 and describes an internal configuration (hardware configuration) thereof. The input terminal device 1 is used by being connected to a mobile information terminal 2 such as a smartphone. The input terminal device 1 of the present embodiment has a finger operation mode (non-contact detection scheme) using light reflection and a touch operation mode (contact detection scheme) as an operation input function.

A main controller 101 includes a central processing unit (CPU), etc. and controls the entire input terminal device 1 according to various operation programs and data stored in a read only memory (ROM) 102 or a random access memory (RAM) 103. A system bus 100 is a data communication path for performing data transmission and reception between the controller 101 and each unit in the input terminal device 1.

The ROM 102 is a memory in which various programs for controlling the input terminal device 1 are stored. For example, a rewritable ROM such as an electrically erasable programmable ROM (EEPROM) or a flash ROM is used. The RAM 103 is used as a temporary storage area at execution of the program stored in the ROM 102 or temporary storage of finger position information detected by a finger position detection sensor 106. A storage unit 104 stores information such as operation setting values of the input terminal device 1 and uses, for example, a nonvolatile rewritable device such as a flash ROM or a solid state drive (SSD). The ROM 102 and the RAM 103 may be integrated with a main controller 101. In addition, the ROM 102 is not configured to be an independent configuration, and it is possible to adopt a configuration in which a partial storage area in the storage unit 104 is used.

An acceleration sensor 105 is a sensor that detects acceleration of the input terminal device 1. The finger position detection sensor 106 is a sensor that detects a position of a position input object such as a finger of a user or a pen using reflected light in a non-contact manner. A short-distance radio communication unit 107 is connected to the mobile information terminal 2 by wireless communication and transmits information input to the input terminal device 1. For example, Bluetooth (registered trademark), WiFi (registered trademark), etc. is used as a communication scheme.

A display controller 108 controls display of an input character, various setting images of the input terminal device 1, etc. on a display unit 109*a*. A touch panel 109 includes a display unit 109*a* and a touch operation input unit 109*b*. The display unit 109*a* is a display device such as a liquid crystal panel and displays a character, an image, etc. under the control of the display controller 108. The touch operation input unit 109*b* is disposed on a display surface of the display unit 109*a*.

For example, the touch operation input unit 109*b* is a touch pad type input device of a capacitive type, etc. and detects a touch operation by the finger, a touch pen, etc. as an operation input. Specifically, for example, the touch operation input unit 109*b* detects a gesture referred to as a swipe for moving the finger in a specific direction while touching the touch panel with the finger, a gesture referred to as a flick for releasing the finger while moving the finger at a speed of a predetermined value or more after touching the touch panel with the finger, a gesture referred to as a tap for quickly releasing the finger after touching the touch panel with the finger, etc. In this way, it is possible to perform operation input to the input terminal device 1 using a touch scheme.

For example, a clocking unit 110 measures an elapsed time from a date/time set by the user using a real time clock (RTC) circuit and outputs date/time information. The main controller 101 performs processing of a timer, etc. by reading the date/time information output from the clocking unit 110. An operation input unit 111 is an instruction input unit for inputting an operation instruction to the input terminal device 1 and has a button for turning ON/OFF a power supply or setting an operation mode.

As described above, the input terminal device 1 of the present embodiment includes the finger position detection sensor 106 that detects a position of the finger of the user without contact to input a character, etc., the touch operation input unit 109b that inputs an operation by touching the touch panel 109 with the finger, and the display unit 109a that displays a character, an image, etc. In this way, two operation input functions corresponding to the finger operation mode and the touch operation mode are allowed.

FIG. 1B is a diagram illustrating an example of a software configuration of the input terminal device 1 and illustrates a configuration of software in the ROM 102, the RAM 103, and the storage unit 104.

The main controller 101 configures a basic operation processing control unit 1021, a finger position information acquisition unit 1022, and a touch position information acquisition unit 1023 by executing a program stored in the ROM 102. In addition, the RAM 103 includes a temporary storage area 1031 that temporarily holds data as necessary at the time of executing a program stored in the ROM 102. Setting information 1041 for executing a program stored in the ROM 102 is stored in the storage unit 104. For the sake of simplicity, the following description will be made on the assumption that the main controller 101 executes a program stored in the ROM 102 to control each operation block.

The basic operation processing control unit 1021 controls various settings and an overall operation of the input terminal device 1. The finger position information acquisition unit 1022 acquires position information of a position input object such as the finger of the user, the pen, etc. on the basis of an output of the finger position detection sensor 106. The touch position information acquisition unit 1023 acquires information about a position at which the finger, a touch pen, etc. touches the touch panel 109 on the basis of an output of the touch operation input unit 109b.

A finger operation processing control unit 1024 determines a type of input operation on the basis of information about a position of a position input object acquired from the finger position information acquisition unit 1022 and controls an operation corresponding to a determination result. The touch operation processing control unit 1024 determines a type of input operation on the basis of information about a position at which the touch panel 109 is touched acquired from the touch position information acquisition unit 1023, and controls a process corresponding to a determination result.

Figure 2:
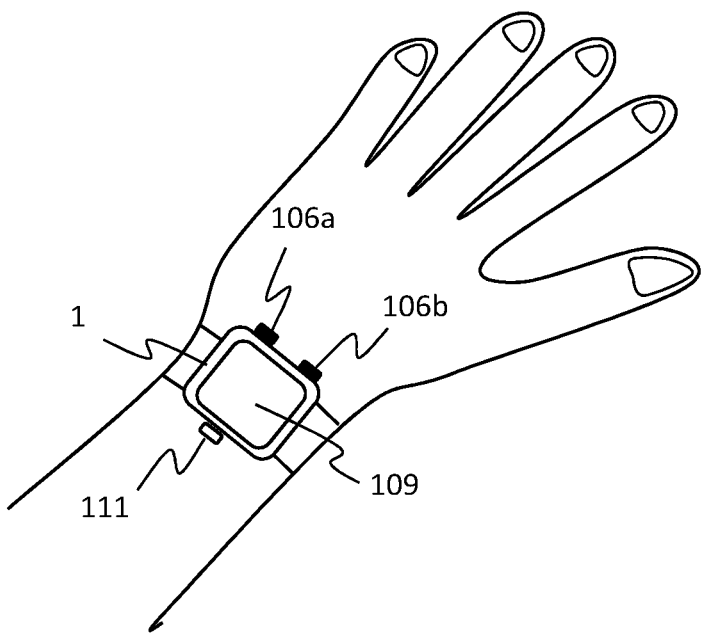
FIG. 2 is a diagram illustrating an appearance of the input terminal device.

FIG. 2 is a diagram illustrating an appearance of the input terminal device 1. The input terminal device 1 is a wristwatch type input terminal device and is used by being worn on a wrist of the user. The touch panel 109 (display unit 109a) is disposed on a device surface side. Two sensors 106a and 106b are disposed as the finger position detection sensor 106 on a back side of the hand of the user on a device side surface. For example, these sensors include light emitting/light receiving elements. In addition, an operation button is disposed as the operation input unit 111 on an arm side of the user on the device side surface.

Figure 3:
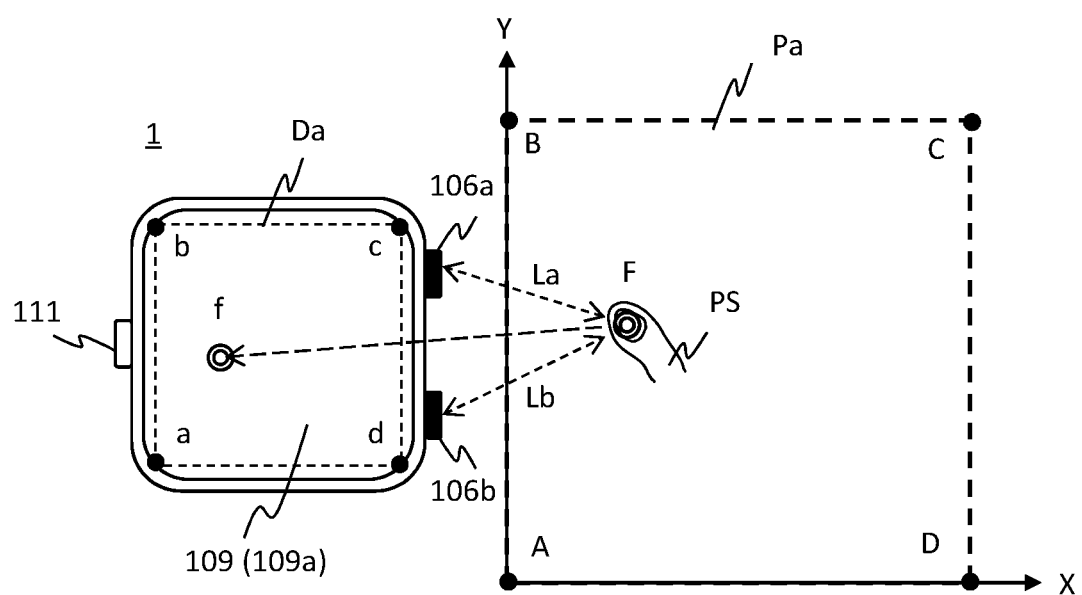
FIG. 3 is a diagram illustrating a principle of detection of a finger operation mode.

FIG. 3 is a diagram illustrating a principle of detection of the finger operation mode and illustrates a relationship between a position of the finger and a display position of the display unit. For example, the finger (position input object) PS of the user moves in positions A-B-C-D on the back side of the hand of the user. The finger position detection sensors 106a and 106b include an infrared light emitting element and a light receiving element, infrared light emitted from the light emitting element is reflected by the finger PS, and reflected light is detected by the light receiving element. Levels of detection signals at the light receiving element correspond to distances La and Lb from the respective sensors 106a and 106b to the finger PS.

An output signal of the finger position detection sensor 106 is sent to the finger position information acquisition unit 1022 to acquire a position F of the finger PS in a position input detection range Pa represented by the positions A-B-C-D. In addition, the positions A-B-C-D of a position input detection range Pa correspond to positions a-b-c-d of a display range Da of the display unit 109a of the touch panel 109. Accordingly, a display position f of the cursor, etc. in the display range Da is determined according to the position F of the finger PS in the position input detection range Pa.

Figure 4:
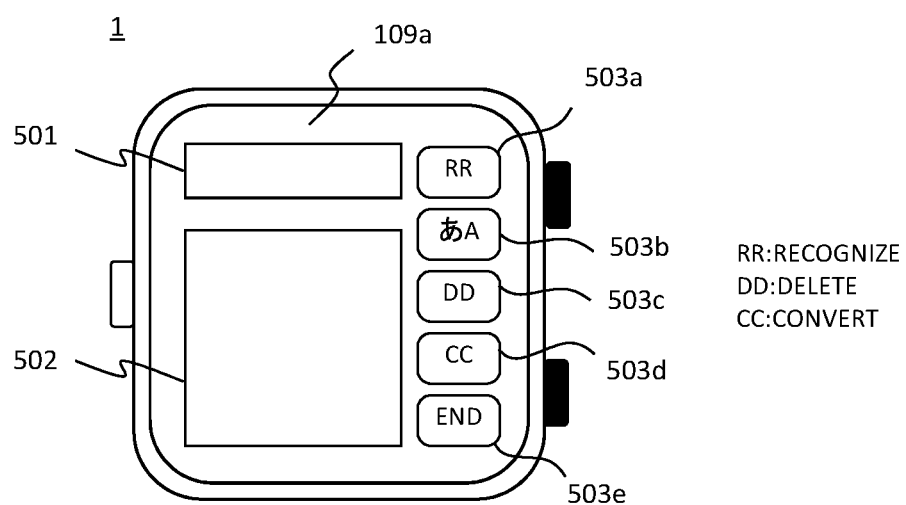
FIG. 4 is a diagram illustrating a display example of a display unit in handwritten character input processing.

FIG. 4 is a diagram illustrating a display example of the display unit 109a in handwritten character input processing. An area 501 displays a result of recognizing an input handwritten character, and an area 502 displays a handwritten character input by the finger. A recognition process instruction button 503a for selecting a process of recognizing a handwritten character, a character type switching process instruction button 503b for switching a type of an input character such as Hiragana, alphabets, etc., a deleting process instruction button 503c for deleting display of an input handwritten character, a character conversion process instruction button 503d for selecting a process of converting a character string of a recognition result displayed in the area 501 into a Chinese character, etc., and an end process instruction button 503e for ending handwritten character input processing are disposed as a button 503 selected by the user for character input processing.

Figure 5:
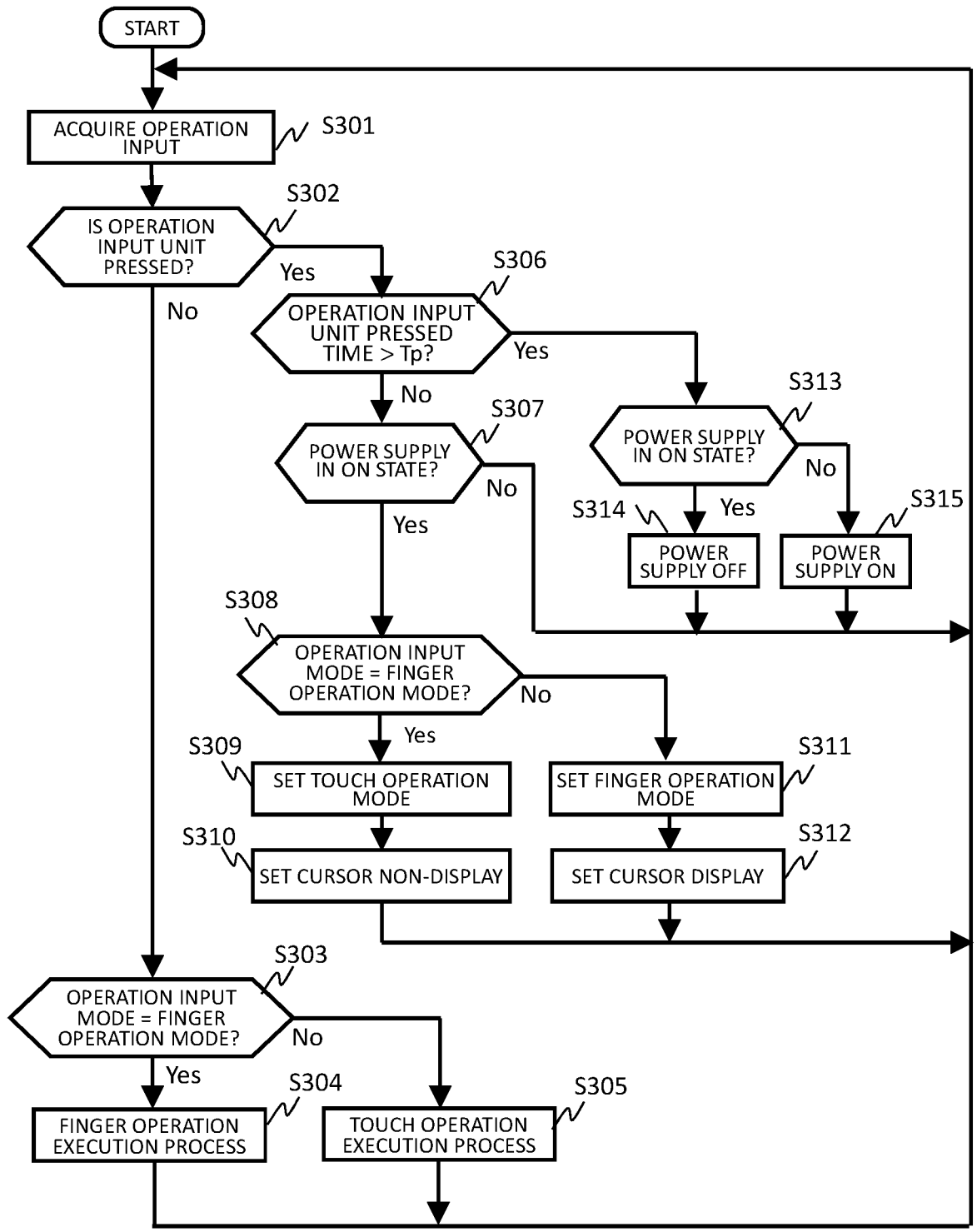
FIG. 5 is a flowchart illustrating operation switching of the entire input terminal device.

FIG. 5 is a flowchart illustrating operation switching of the entire input terminal device 1. Here, switching between power supply ON/OFF and an operation input mode (finger operation mode/touch operation mode) is performed by a button press operation in the operation input unit 111.

In S301, an output of the operation input unit 111 is fetched. In S302, it is determined whether the operation input unit 111 is pressed. When the operation input unit 111 is pressed (Yes), the process branches to S306. In S306, a time during which the operation input unit 111 is pressed is determined, and the operation proceeds to switching ON/OFF of the power supply or switching of the operation input mode.

When the operation input unit 111 has been pressed for a predetermined time Tp or more in a determination process S306 (Yes), the operation branches to S313 and an ON/OFF switching process is performed depending on whether the power supply is in an ON state. When the power supply is in an ON state (Yes) in S313, the operation branches to S314, the power supply is turned OFF, and the operation returns to S301. In the case of turning OFF the power supply, in order to reduce power consumption, power supply to a part excluding the main controller 101, the clocking unit 110, the operation input unit 111, etc. is suspended. When the power supply is in an OFF state (No) in S313, the operation branches to S315, the power supply is turned ON, and the operation returns to S301. When the power supply is turned ON, power is supplied to each unit included in the input terminal device 1.

When the operation input unit 111 has not been pressed for the predetermined time Tp or more (No) in the determination process S306, the process branches to S307 and it is determined whether the power supply is in an ON state. When the power supply is turned OFF (No), the operation returns to S301. When the power supply is turned ON (Yes), the process branches to S308.

In S308, an operation of switching the operation input mode is performed. That is, when a current operation input mode is set to the finger operation mode (Yes), switching to the touch operation mode is set in S309, and setting is made such that the cursor is not displayed on the display unit 109a of the touch panel 109 in S310. When the current operation input mode is not set to the finger operation mode (No) (that is, when the current operation input mode is set to the touch operation mode), switching to the finger operation mode is set in S311, and setting is made such that the cursor is displayed on the display unit 109a of the touch panel 109 in S312.

When the operation input unit 111 is not pressed in a determination process S302 (No), the operation proceeds to S303, and a process is performed according to the set operation input mode. In the case of the finger operation mode (Yes), the operation proceeds to S304, a type of input operation is determined on the basis of information about a position of the finger acquired from the finger position information acquisition unit 1022, and a process corresponding to a determination result is executed. When the mode is not the finger operation mode (No) (that is, in the case of the touch operation mode), the operation proceeds to S305, a type of input operation is determined on the basis of information about a touched position acquired from the touch position information acquisition unit 1023, and a process corresponding to a determination result is executed. After processing in the finger operation execution process S304 or the touch operation execution process S305 is executed, the operation returns to S301.

Hereinafter, a detailed description will be given of handwritten character input processing in the finger operation mode. In the present embodiment, character input by handwriting can be correctly and easily performed by giving a plurality of operation states (operation modes) to the finger operation.

FIG. 6 is a diagram illustrating an operation mode and an example of cursor display corresponding thereto. An operation mode M0 corresponds to a state (suspend drawing) in which drawing for character input other than cursor movement is not performed even when the finger is manipulated. An operation mode M1 corresponds to a state in which when the finger is manipulated, drawing for character input is executed in response to a position thereof. In addition, display of the cursor (for example, white/black display) is switched according to the operation mode so that the user can easily identify the current operation mode. Referring to switching of the operation mode, as will be described below, the operation mode may be switched from M0 to M1 or reversely from M1 to M0 by performing a specific operation of holding a finger being operated for a predetermined time t0 or more at a certain position on the operation surface.

In this way, drawing is allowed only when the operation mode corresponds to M1. Therefore, when a character including a plurality of "strokes" such as line segments, points, etc. is input, a desired character may be easily and correctly input by setting the operation mode to M1 for a part of a valid "stroke" and setting the operation mode to M0 for an invalid part moving between a "stroke" and a "stroke".

Figure 7:
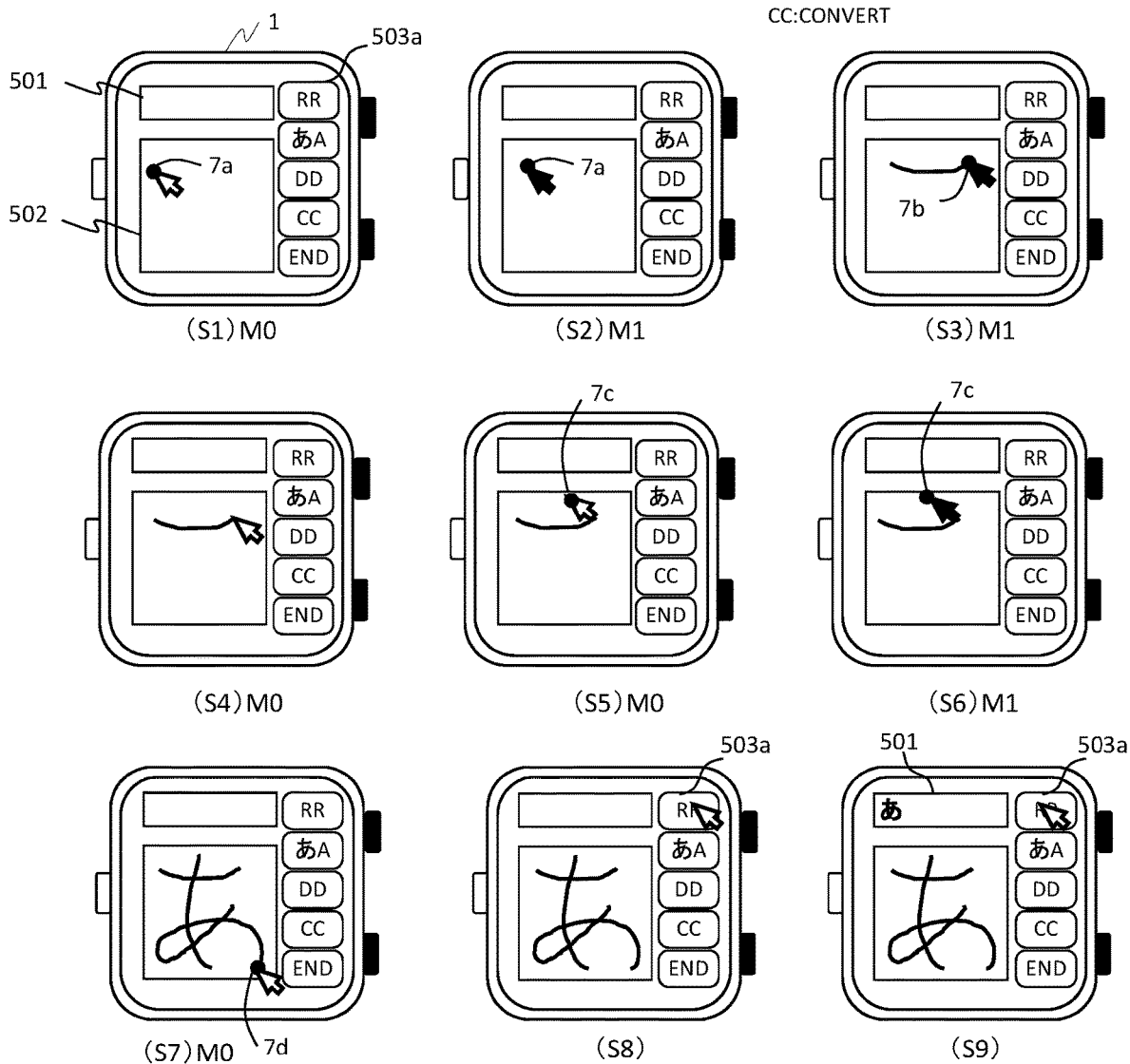
FIG. 7 is a diagram illustrating an example of screen display in handwritten character input processing.

FIG. 7 is a diagram illustrating an example of screen display in handwritten character input processing. Here, the case of inputting a Hiragana character "a" is taken as an example. A procedure of character input is indicated by (S1) to (S9), and an operation mode (M0/M1) at the time is added.

In the following description, an expression "a cursor is "held" at a certain position" is used. However, even when a case in which the position of the cursor moves within a predetermined distance r0 (blur) is present, this case is allowed and regarded as a "held" state. This r0 is caused by unintended movement (hand shake, etc.) by the user and set to a value of about several mm, for example. In addition, for example, time t0 for determining a state to be a "held" state is set to a value of about several seconds. These threshold values may be set according to the user and a use environment.

(S1): In a state in which the operation mode corresponds to M0 (suspend drawing), the cursor is moved to a position 7a in the character input display area 502 by moving the finger PS within a position input detection range Pa.

(S2): The cursor is held at the position 7a for a predetermined time t0 or more. As a result, the operation mode switches to M1 (execute drawing), and display of the cursor changes.

(S3): The finger is moved when the display of the cursor is changed, and the cursor is moved to a position 7b of the character input display area 502. As a result, a line from the position 7a to the position 7b is drawn.

(S4): The cursor is held at the position 7b for a predetermined time t0 or longer. As a result, the operation mode switches to M0 (suspend drawing) and the display of the cursor changes.

(S5): The finger is moved where the display of the cursor changes, and the cursor is moved to a position 7c of the character input display area 502.

(S6): Holding is performed at the position 7c for a predetermined time t0 or more. As a result, the operation mode switches to M1 and the display of the cursor changes.

Hereinafter, similarly, the drawing operation is continued. That is, when drawing is performed, the cursor is moved by setting the operation mode to M1. When drawing is not performed, the cursor is moved by setting the operation mode to M0. In addition, the cursor is held at the moved position for a predetermined time t0 or more to switch the operation mode, thereby performing handwritten character input.

(S7): When drawing of the Hiragana character "a" is completed, holding is performed at a position 7d for a predetermined time t0 or more. As a result, the operation mode switches to M 0 and the display of the cursor changes.

(S8): The cursor is moved to the recognition process instruction button 503a.

(S9): The recognition process is executed by holding the cursor on the recognition process instruction button 503a for a predetermined time t0 or more, and a recognized result is displayed in the display area 501.

Figure 8:
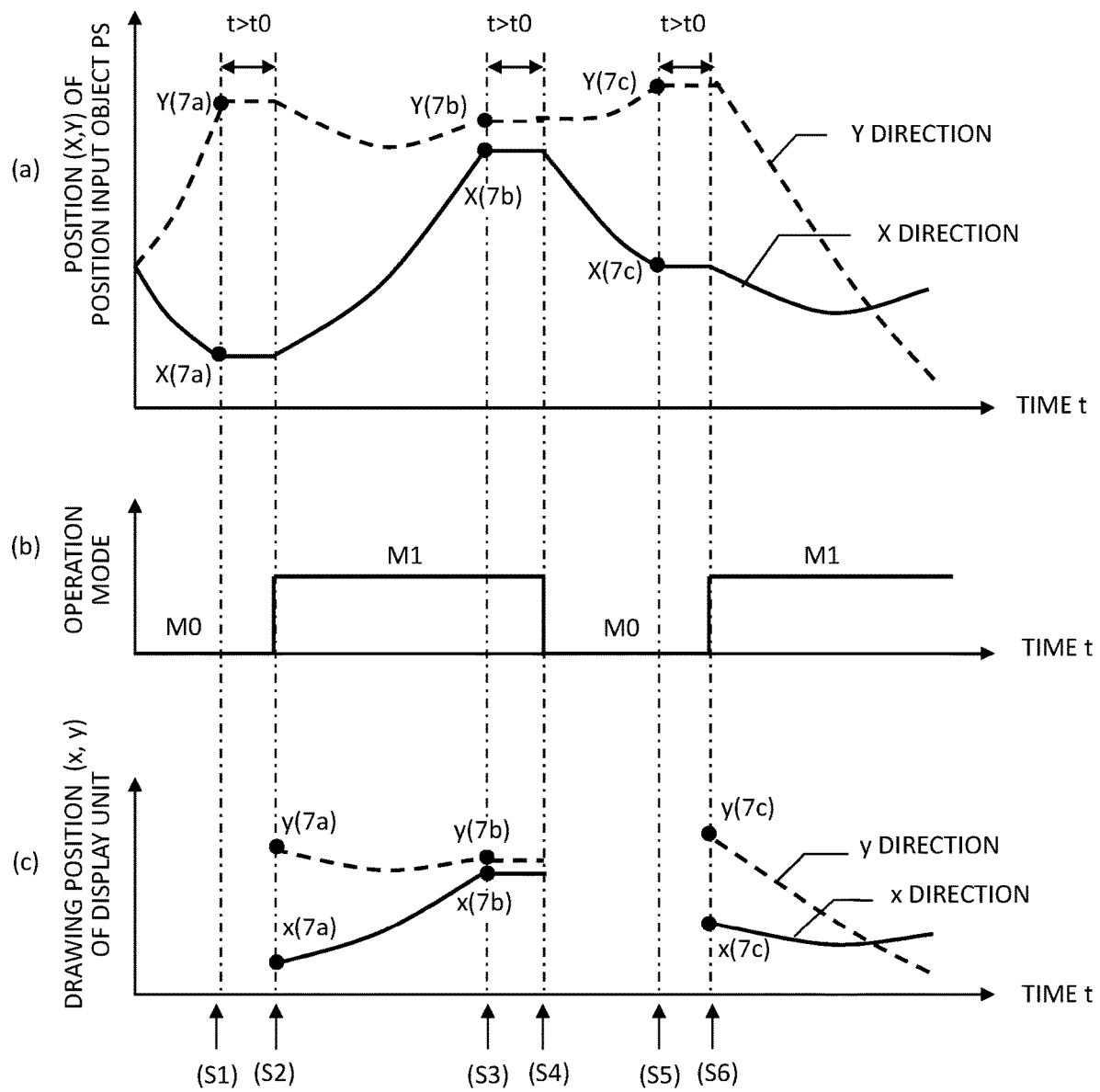
FIG. 8 is a diagram illustrating a time change of an operation mode and a drawing position in FIG. 7.

FIG. 8 is a diagram illustrating a time change of an operation mode and a drawing position in FIG. 7. (a) illustrates a position of the position input object (user finger) PS, (b) illustrates the operation mode, and (c) illustrates a display unit drawing position. (S1) to (S6) on the horizontal axis and symbols (7a) to (7c) on the horizontal axis correspond to the symbols in FIG. 7. In this manner, drawing is performed only during the operation mode M1, and the operation mode is switched by holding the position input object PS at the same position for the time t0 or more.

Figure 9:
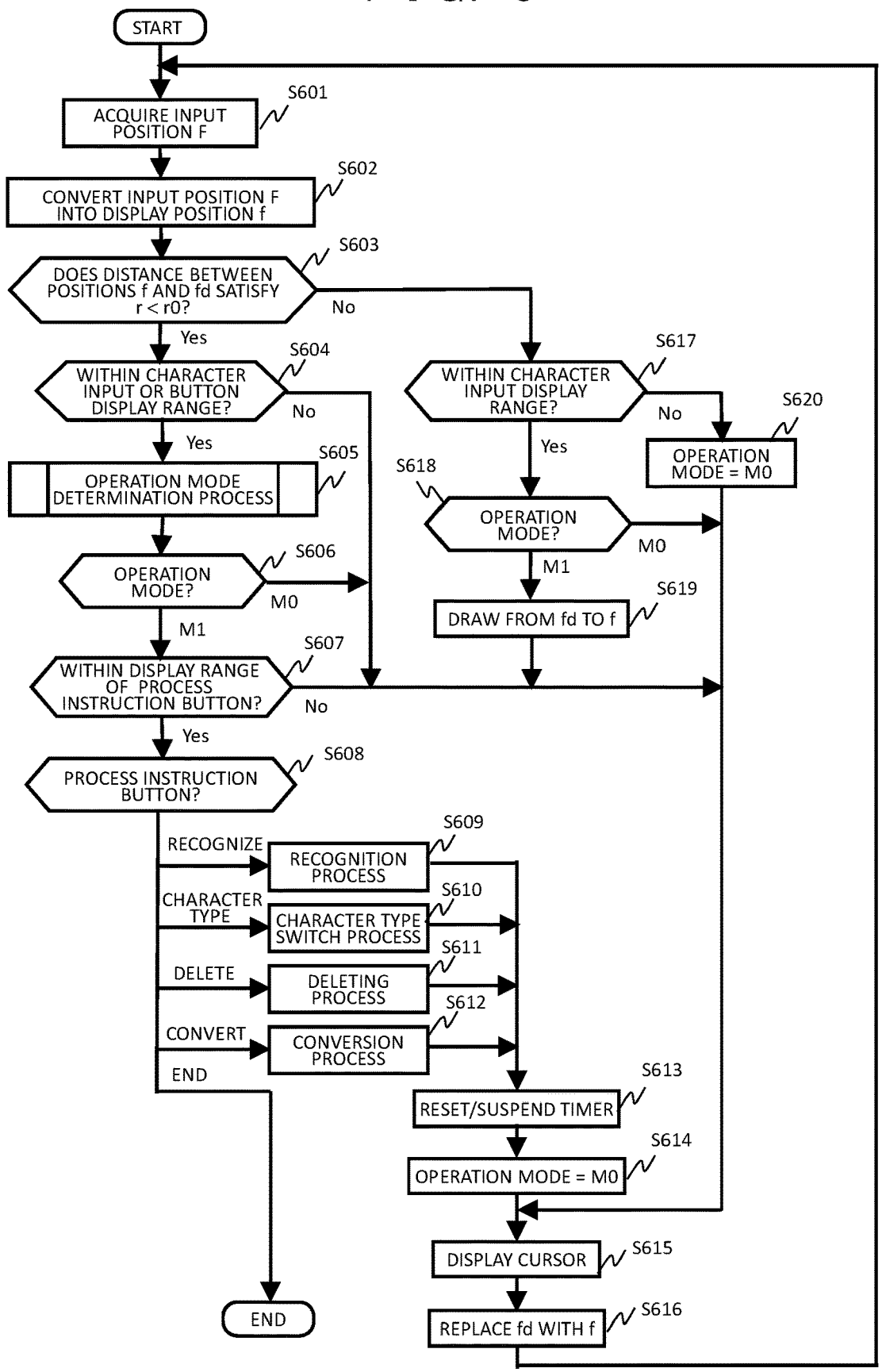
FIG. 9 is a flowchart illustrating handwritten character input processing in the finger operation mode.

FIG. 9 is a flowchart illustrating handwritten character input processing in the finger operation mode. Hereinafter, contents of the respective processes will be described in order.

The position F of the finger PS is acquired by the finger position information acquisition unit 1022 in S601, and the acquired position F of the finger PS is converted into the position f in the display range Da as illustrated in FIG. 3 in S602. Subsequently, in S603, it is determined whether a distance r between the position f and the previously acquired position fd stored in the temporary storage area of the RAM 103 is equal to or less than a predetermined distance r0.

In the determination process S603, the process branches to S617 when the distance r is equal to or greater than the predetermined distance r0 (No). In S617, it is determined whether the position f is within the display range of the character input display area 502. When the position f is within the range of the character input display area 502 (Yes), the process branches to S618. When the position f is out of the range of the character input display area 502 (No), the process branches to S620. In S620, the operation mode is set to M0, and the operation proceeds to S615.

In S618, the set operation mode is determined. When the operation mode is M0, the operation proceeds to S615 without performing the drawing process. When the operation mode is M1, the process branches to S619, the drawing process from the position fd to the position f in the display range Da is performed, and the operation proceeds to S615.

On the other hand, when the distance r is equal to or less than the predetermined distance r0 (Yes) in the determination process S603, the process branches to S604. In S604, it is determined whether the position f is within the display range of the predetermined area 502 in which character input is performed in the display range Da or within the display range of the process instruction button 503. When the position f is within the display range of the character input display area 502 or the process instruction button 503 (Yes), the operation proceeds to S605. When the position f is out of the display range of the character input display area 502 or the process instruction button 503 (No), the operation proceeds to S615.

In S605, the operation mode is determined by the timer. That is, a holding time is compared with the predetermined time t0 to switch the operation mode. Details of the determination process in S605 will be described with reference to FIG. 10. In S606, branch processing is performed according to the determined operation mode. When the operation mode is M0, the operation proceeds to S615. When the operation mode is M1, the operation proceeds to S607. In S607, it is determined whether the position f is within the display range of the process instruction button 503. When the position f is within the display range of the process instruction button 503 (Yes), the operation proceeds to S608. When the position f is out of the display range of the process instruction button 503 (No), the operation proceeds to S615.

In S608, branch processing is performed according to a display range of one of the process instruction buttons 503a to 503e corresponding to the position f. When the position f is within the display range of the recognition process instruction button 503a, the operation proceeds to S609 and the recognition process is executed. When the position f is within the display range of the character type switching process instruction button 503b, the operation proceeds to S610 and the character type switching process is executed. When the position f is within the display range of the deleting process instruction button 503c, the operation proceeds to S611 and the deleting process is executed. When the position f is within the display range of the conversion process instruction button 503d, the operation proceeds to S612 and conversion process is executed. After executing each process, the operation proceeds to S613 to reset/suspend the timer, and the operation mode is set to M0 in S614. When the position f is within the display range of the end process instruction button 503e, the handwritten character input processing is terminated.

In S615, for example, a cursor illustrated in FIG. 6 is displayed at the position f in the display range Da according to the set operation mode. Subsequently, in S616, the current position f is substituted as a previous position fd, stored in the temporary storage area of the RAM 103, and the process returns to S601.

Figure 10:
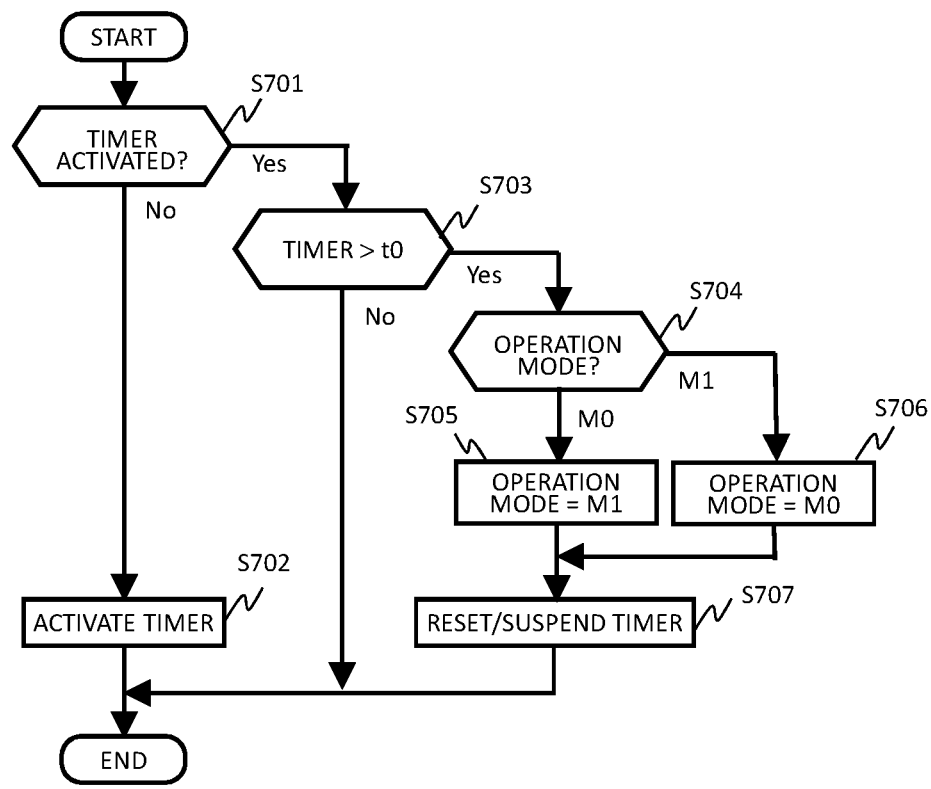
FIG. 10 is a flowchart illustrating an operation mode determination process S605 in FIG. 9.

FIG. 10 is a flowchart illustrating an operation mode determination process S605 in FIG. 9.

In S701, it is determined whether the timer has been activated. When the timer has not been started (No), the operation proceeds to S702 to activate the timer, and the process is terminated. When the timer has been activated (Yes), the operation proceeds to S703.

In S703, it is determined whether the timer has exceeded a predetermined time t0. When the timer has not exceeded the predetermined time t0 (No), the process is terminated. When the timer exceeds the predetermined time t0 (Yes), the operation proceeds to S704.

In S704, branch processing according to the operation mode is performed. When the operation mode is M0, the flow advances to S705 to switch the operation mode to M1. When the operation mode is M1, the flow advances to S706 to switch the operation mode to M0. Thereafter, the operation proceeds to S707, where the timer is reset/suspended, and the process is terminated.

As described above, in Embodiment 1, the operation mode is switched by holding the position on the display screen of the position input object such as the finger of the user within the predetermined distance r0 or more for a predetermined time t0 or more. The operation mode is set to M1 to move the cursor when drawing is performed, and the operation mode is set to M0 to move the cursor when drawing is not performed. In this way, it possible to distinguish movement between the stroke and the stroke as a non-drawing section even when a character having a plurality of strokes is input, and it is easy to correctly input an intended character eve when a writing order is incorrect. In addition, it is possible to input more complicated characters such as Chinese characters.

In addition, it is possible to perform a process corresponding to the process instruction button by moving the cursor to an area in which the process instruction button is displayed and holding a position within a predetermined distance r0 from a position to which the cursor is moved for a predetermined time t0 or more, and to perform a similar operation to clicking by moving the cursor to the position at which the process instruction button is displayed using input means such as a mouse.

The present embodiment shows an example in which the process instruction button includes the recognition process instruction button 503a, the character type switching process instruction button 503b, the deleting process instruction button 503c, the character conversion process instruction button 503d, and the end process instruction button 503e. However, the invention is not limited thereto, and another process instruction button may be provided.

Further, in the present embodiment, the operation input mode (touch operation mode) by the touch panel 109 and the operation input mode (finger operation mode) by the finger position detection sensor 106 are switched by the operation input unit 111. However, switching may be performed using another scheme. For example, in the case of tapping the back of the hand with the finger, vibration is detected by the acceleration sensor 105 and touch is not detected on the touch panel 109, and thus it is determined that the back of the hand is tapped from a detection result of the touch panel 109 and a detection result of the acceleration sensor 105. In the case of tapping the back of the hand with the finger, the operation input mode may be switched.

In addition, the present embodiment employs an operation of holding a position on a display screen of the position input object such as the finger of the user within the predetermined distance r0 for the predetermined time to or more as a specific operation for switching the operation mode. However, the invention is not limited thereto. As another specific operation, for example, it is possible to move the cursor by moving the position input object and to switch the operation mode by tapping the back of the hand at the moved position.

Embodiment 2

In Embodiment 2, a description will be given of the case of performing input by selecting a key displayed on a screen such as a keyboard. In a small mobile information terminal, a key displayed on the display unit 109a is small, and it is difficult to perform input by touching the touch panel 109 with the finger. Therefore, key character input is performed in the finger operation mode.

FIG. 11 is a diagram illustrating a configuration of the display unit 109a for key character input processing. An area 1001 is a portion for displaying a character subjected to key character input, and a character input key 1002 is a key for selecting an input character. A key 1003 is used to instruct various types of processes and includes a character type switching process instruction key 1003a for switching a type of character to be inputted such as Hiragana and alphabet, a deleting process instruction key 1003b for deleting an input character displayed in the area 1001, an end process instruction key 1003c for ending key character input processing, etc.

Figure 12:
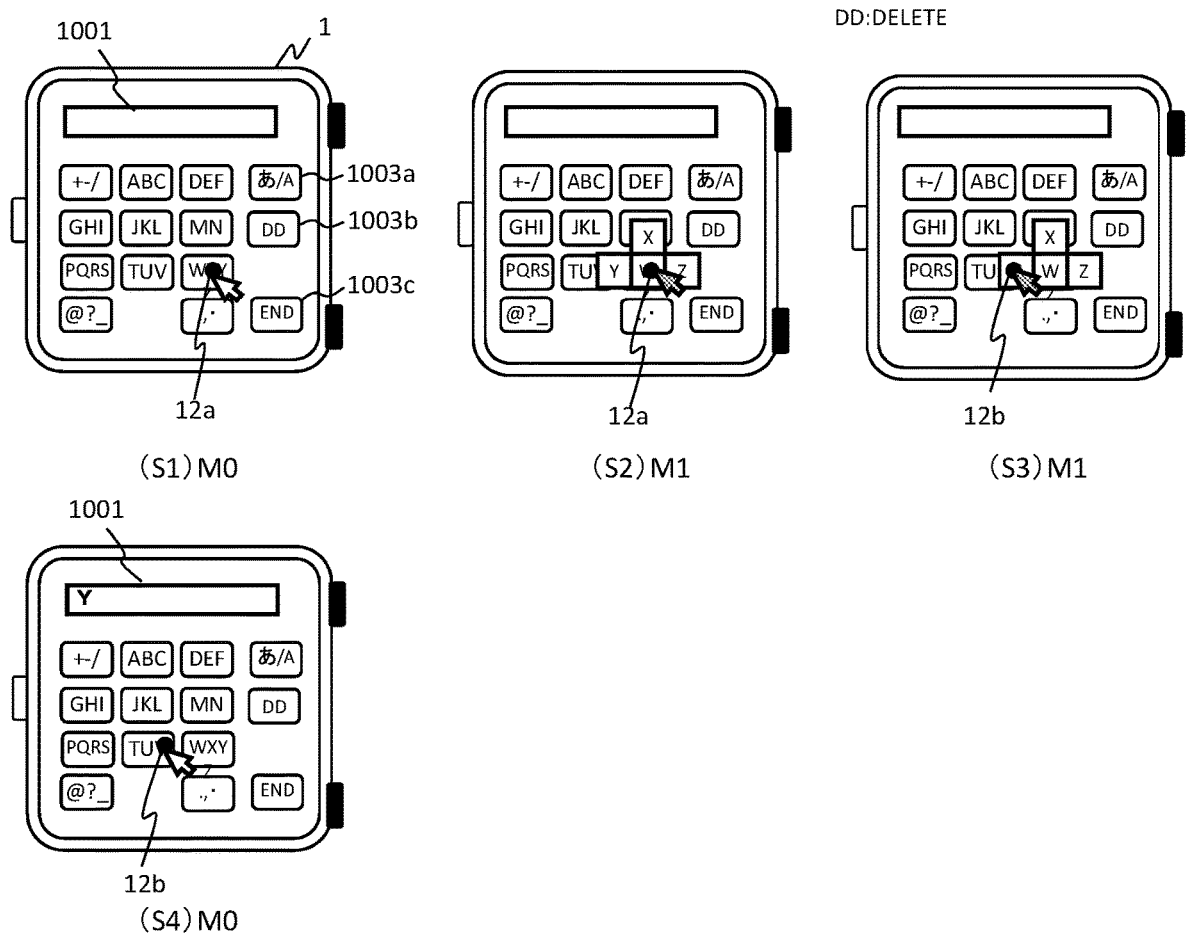
FIG. 12 is a diagram illustrating an example of key character input processing in a finger operation mode.

FIG. 12 is a diagram illustrating an example of key character input processing in the finger operation mode. Here, a case in which an alphabet character "Y" is input is given as an example. An input procedure will be described in (S1) to (S4).

(S1): In a state in which the operation mode corresponds to M0, the finger PS is moved within the position input detection range Pa, thereby moving the cursor to a position 12a at which a character input key "WXYZ" is displayed.

(S2): The cursor is held at the position 12a for a predetermined time t0 or more (in this case, movement within a predetermined distance r0 is allowed, which is applied to the following description). In this way, the operation mode is switched to M1, and display for selecting characters "W", "X", "Y", and "Z" is performed.

(S3): When character selection display is performed, the finger is moved, and the cursor is moved to a position 12b at which a character "Y" is displayed.

(S4): The cursor is held at the position 12b for a predetermined time t0 or more. As a result, the character "Y" is determined as the input character, and the character "Y" is displayed in an input character display area 1001. When the character input is completed, the operation mode is switched to M0.

Figure 13:
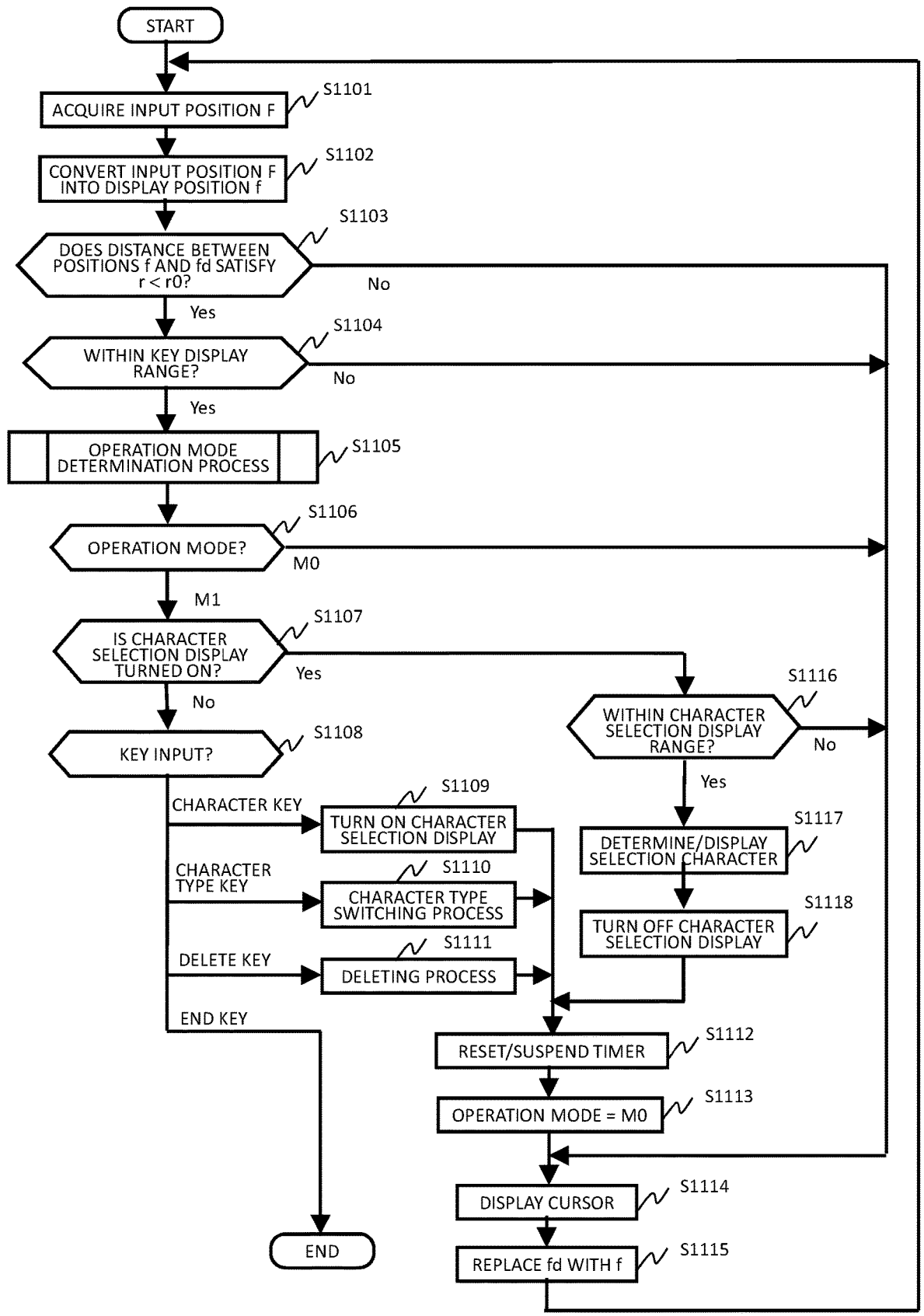
FIG. 13 is a flowchart illustrating key character input processing in the finger operation mode.

FIG. 13 is a flowchart illustrating key character input processing in the finger operation mode.

In S1101, the position F of the finger PS is acquired by the finger position information acquisition unit 1022. In S1102, the acquired position F of the finger PS is converted into the position f in the display range Da. Subsequently, in S1103, it is determined whether a distance r between a position f and a previously acquired position fd is less than or equal to a predetermined distance r0.

In a determination process S1103, when the distance r is greater than or equal to the predetermined distance r0 (No), the operation branches to S1114. When the distance r is less than or equal to the predetermined distance r0 (Yes), the operation branches to S1104. In S1104, it is determined whether the position f is within a display area of the character input key 1002 or the process instruction key 1003. In a determination process S1104, the operation branches to S1105 when the position f is within a display area of the character input key 1002 or the process instruction key 1003 (Yes), and the operation branches to S1114 when the position f is out of the character input key 1002 or the process instruction key 1003 (No).

In S1105, the operation mode is determined by the timer. That is, the holding time is compared with the predetermined time t0 to switch the operation mode. Details of a determination process of S1105 will be described in FIG. 14. In S1106, branch processing is performed depending on the determined operation mode. The operation proceeds to S1114 when the operation mode is M0, and the operation proceeds to S1107 when the operation mode is M1. In S1107, it is determined whether character selection display is in an ON state.

In a determination process S1107, the operation proceeds to S1116 when character selection display is turned ON (Yes), and the operation proceeds to S1108 when character selection display is turned OFF (No). In S1116, it is determined whether the position f is within a character selection display area. The operation proceeds to S1117 when the position f is within a character selection area (Yes), and the operation proceeds to S1114 when the position f is out of the character selection display area (No). In S1117, a character displayed at the position f is determined as an input character and displayed in the input character display area 1001. In S1118, character selection display is turned OFF, and the operation proceeds to S1112.

In S1108, branch processing is performed depending on whether the position f is within a key display area of the character input key 1002 or the process instruction key 1003. When the position f is within the display area of the character input key 1002, the operation proceeds to S1109 to turn ON character selection display and perform selection display of a character corresponding to the key displayed at the position f. When the position f is within a display area of the character type switching process instruction key 1003a, the operation proceeds to S1110 to execute a character type switching process. When the position f is within a display area of a deleting process instruction key 1003b, the operation proceeds to S1111, and a deleting process is executed. After executing each process, the operation proceeds to S1112, and the timer is reset/suspended. In S1113, the operation mode is set to M0. When the position f is within a display area of the end process instruction key 1003c, key character input processing is ended.

In S1114, for example, the cursor illustrated in FIG. 6 is displayed at the position f in the display range Da according to the set operation mode. Subsequently, in S1115, the current position f is replaced with the previous position fd and stored in the temporary storage area of the RAM 103, and the process returns to S1101.

Figure 14:
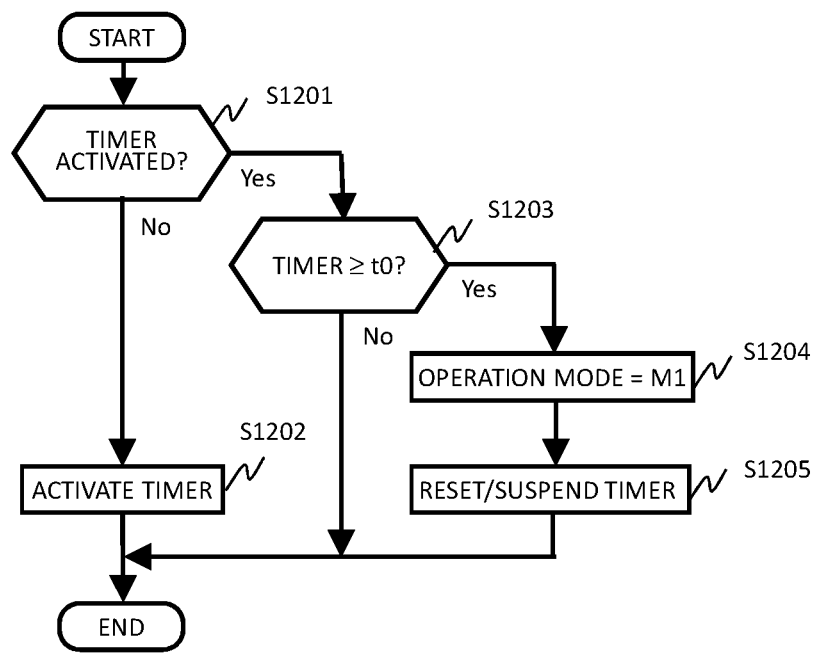
FIG. 14 is a flowchart illustrating an operation mode determination process S1105 in FIG. 13.

FIG. 14 is a flowchart illustrating an operation mode determination process S1105 in FIG. 13.

In S1201, it is determined whether the timer is activated. When the timer is not activated (No), the operation proceeds to S1202 to activate the timer, and the process is ended. When the timer is activated (Yes), the operation proceeds to S1203.

In S1203, it is determined whether the timer exceeds a predetermined time t0. When the predetermined time t0 is not exceeded (No), the process is ended. When the predetermined time t0 is exceeded (Yes), the operation proceeds to S1204.

In S1204, the operation mode is switched to M1. In this case, in S1113 of FIG. 13, the operation mode after execution of key character input is switched to M0, and thus switching from M1 to M0 is unnecessary. Thereafter, the operation proceeds to S1205 to reset/suspend the timer and end the process.

As described above, in Embodiment 2, it is possible to easily select an input character and instruct an executed process by moving the cursor to a position at which the character input key or the process instruction key is displayed and holding a position within a predetermined distance r0 from the position of the moved cursor for a predetermined time t0 or more. In this way, it is possible to perform a similar operation to clicking by moving the cursor to the position at which the character input key or the process instruction button is displayed using input means such as a mouse.

In the present embodiment, an example of including the character type switching process instruction key 1003a, the deleting process instruction key 1003b, and the end process instruction key 1003c as the process instruction key is shown. However, the invention is not limited thereto, and it is possible to provide a key corresponding to another process instruction. In addition, the character input key may be input by displaying a keyboard corresponding to one key of alphabet or Hiragana corresponds or a keyboard corresponding to input of a number.

Embodiment 3

In Embodiment 3, an operation such as clicking, double clicking, dragging and dropping by the mouse (hereinafter referred to as mouse operation input processing) is realized in the finger operation mode. In order to respond thereto, types of operation modes are increased in this embodiment.

FIG. 15 is a diagram illustrating an example of an operation mode and cursor display used in mouse operation input processing. Here, six types of operation modes M0 to M5 are used. The operation mode M0 corresponds to a state in which any input operation is not performed except for cursor movement even when the finger is manipulated. The operation modes M1 to M5 correspond to states of performing mouse operations of a drag process (M1), a double click process (M2), start of the drag process (M3), end of the drag process (M4), and a drop process (M5), respectively. In addition, display (shape and/or color display) of the cursor is switched according to each operation mode. As will be described later, switching of the operation mode is performed by comparing a length of time during which the finger under operation is held at a certain position on the operation surface with three threshold values t0, t1, and t2.

FIG. 16 is a diagram illustrating an example of screen display in mouse operation input processing. An icon group 1401 corresponding to applications A to D is displayed as a window screen (home screen) on the display unit 109a. The user may select a desired application by clicking on an icon, execute an application by double-click, and move a display position of an icon by drag and drop. A flow of a series of processes will be described in (S1) to (S7).

(S1): In a state in which the operation mode corresponds to M0, the finger is moved within a position input detection range, thereby moving the cursor to a position 14a at which an icon [D] is displayed.

(S2): The cursor is held at the position 14a for a predetermined time (range of t0 to t1). In this way, the operation mode is switched to M1 (click process), and the icon [D] is displayed as a mouse operation target. In addition, display of the cursor is changed to display corresponding to M1 of FIG. 15. Thereafter, the click process is executed on the selected icon "D" by arbitrarily moving the finger until the predetermined time t1 elapses (in this case, the cursor is moved to a position away from the position 14a by a predetermined distance r0 or more).

(S3): When the cursor is held at the position 14a for the predetermined time t1 or more, the operation mode is switched to M2 (double click process), and the cursor changes to a display corresponding to M2 illustrated in FIG. 15. Thereafter, when the finger is arbitrarily moved until a predetermined time t2 elapses (the cursor is moved from the position 14a by the predetermined distance r0 or more), the double click process is executed on the selected icon "D".

(S4): When the cursor is held at the position 14a for a predetermined time t2 or more, the operation mode is switched to M3 (start of the drag process), and the cursor changes to a display corresponding to M3 illustrated in FIG. 15.

(S5): Thereafter, when the finger is moved to move the cursor to the position 14b away from the position 14a by the predetermined distance r0 or more, the operation mode is switched to M4 (end of the drag process). In this way, the cursor changes to a display corresponding to M4 illustrated in FIG. 15. In addition, a drag process in which the icon "D" selected as a mouse operation target is moved to the position 14b to which the cursor is moved and displayed, and a position of the selected icon is moved.

(S6): The finger is further moved to move the cursor and the selected icon "D" to a position 14c, and the cursor is held at the position 14c for a predetermined time t0 or more. In this way, the operation mode is switched to M5 (drop process), and the drop process is executed at the position 14c.

(S7): A display position of the selected icon "D" is set at the position 14c by the drop process. Thereafter, the operation mode is switched to M0, and the cursor becomes a display corresponding to M0.

Figure 17:
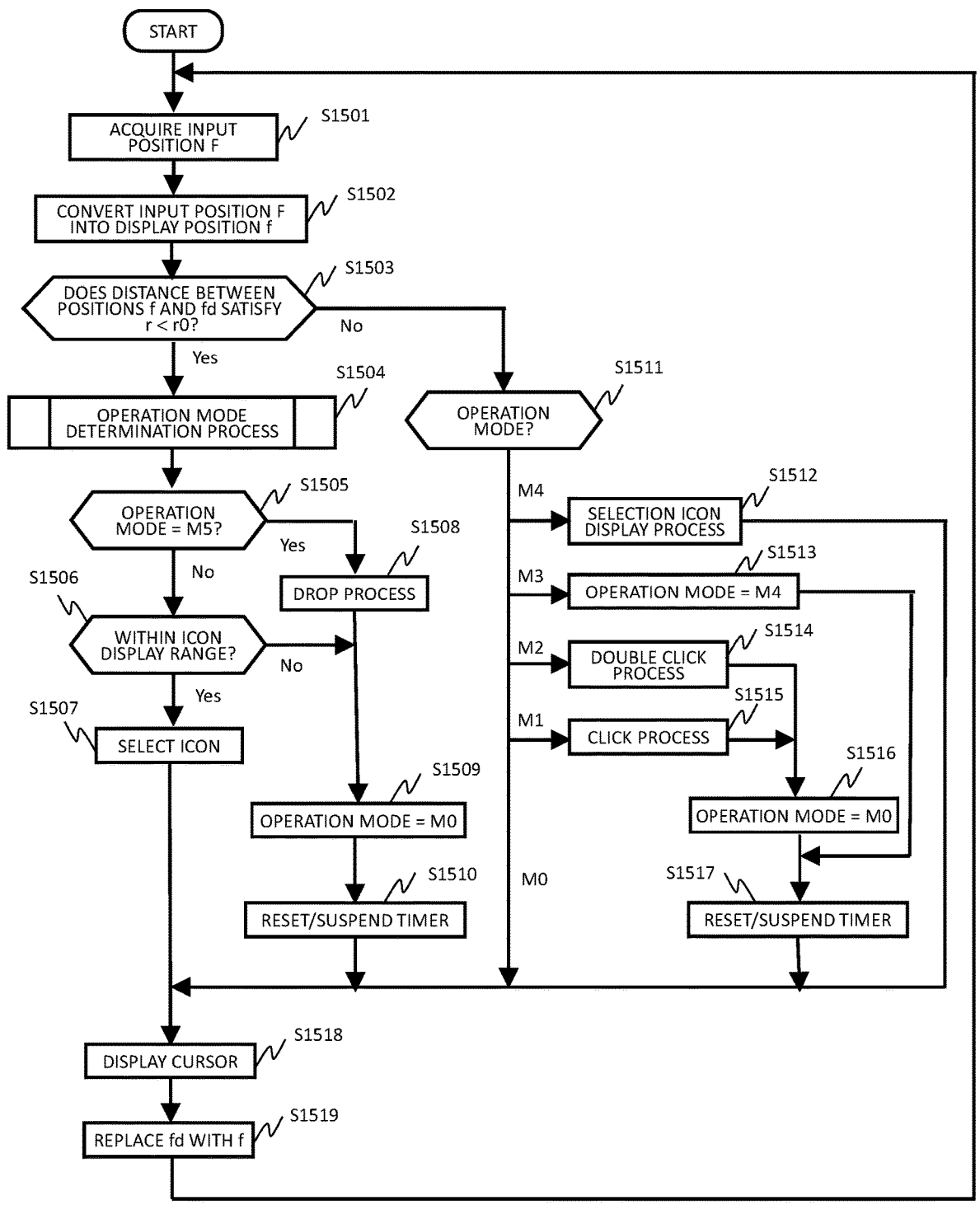
FIG. 17 is a flowchart illustrating mouse operation input processing in a finger operation mode.

FIG. 17 is a flowchart illustrating mouse operation input processing in the finger operation mode.

In S1501, the position F of the finger PS is acquired by the finger position information acquisition unit 1022. In S1502, the acquired position F of the finger PS is converted into the position f in the display range Da. Subsequently, in S1503, it is determined whether the distance r between the position f and the previously acquired position fd is less than or equal to the predetermined distance r0.

In a determination process S1503, the operation branches to S1504 when the distance r is less than or equal to the predetermined distance r0 (Yes). In S1504, the operation mode is determined by the timer. That is, the holding time is compared with the predetermined times t0, t1, and t2 to switch the operation mode. Details of a determination process of S1504 will be described in FIG. 18. Thereafter, in S1505, it is determined whether the operation mode determined in S1504 corresponds to M5. The operation branches to S1508 when the operation mode is M5 (Yes), and the operation branches to S1506 when the operation mode is not M5 (No). In S1508, a drop process of setting a display position of an icon selected by the drag process to the position f is executed, and the operation proceeds to S1509.

In S1506, it is determined whether the position f is within a display area of the icon. The operation branches to S1507 when the position f is within the display area of the icon (Yes), and the operation branches to S1509 when the position f is out of the display area of the icon (No). In S1507, an icon in which the position f is within the display area is selected as the mouse operation target, and the operation proceeds to S1518. In S1509, the operation mode is set to M0, and the operation proceeds to S1510. In S1510, the timer is reset/suspended, and the operation proceeds to S1518.

Meanwhile, in the determination process S1503, when the distance r is greater than or equal to the predetermined distance r0 (No), the operation branches to S1511. In S1511, branch processing below is performed according to the operation mode.

When the operation mode is M0, the process is not performed, and the operation proceeds to S1518.

When the operation mode is M1, the operation proceeds to S1515, the click process is performed on the icon selected as the mouse operation target in S1507, and the operation proceeds to S1516.

When the operation mode is M2, the operation proceeds to S1514, the double click process is performed on the icon selected as the mouse operation target in S1507, and the operation proceeds to S1516.

When the operation mode is M3, the operation proceeds to S1513, the operation mode is set to M4, and the operation proceeds to S1517.

When the operation mode is M4, the operation proceeds to S1512, and the icon selected as the mouse operation target in S1507 is displayed at the position f. In this way, the drag process for moving the position of the selected icon is performed, and then the operation proceeds to S1518.

In S1516, the operation mode is set to M0. In S1517, the timer is reset/suspended, and the operation proceeds to S1518. In S1518, the cursor illustrated in FIG. 15 is displayed at the position f in the display range Da according to a current operation mode. Subsequently, in S1519, the current position f is replaced as the previous position fd and stored in the temporary storage area of the RAM 103, and the operation returns to S1501.

Figure 18:
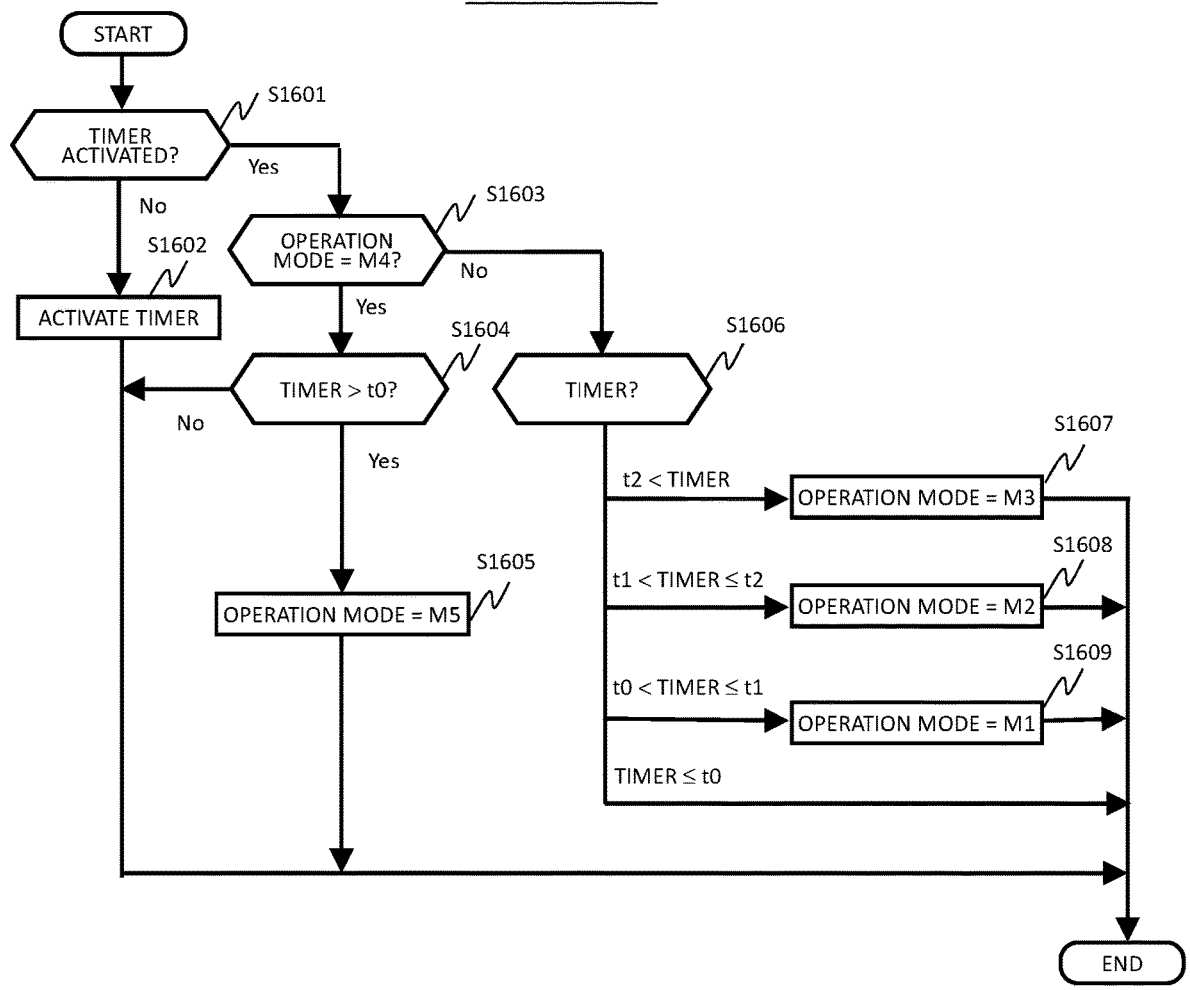
FIG. 18 is a flowchart illustrating an operation mode determination process S1504 in FIG. 17.

FIG. 18 is a flowchart illustrating an operation mode determination process S1504 in FIG. 17.

In S1601, it is determined whether the timer is activated. When the timer is not activated (No), the operation proceeds to S1602 to activate the timer, and the process is ended. When the timer is activated (Yes), the operation proceeds to S1603.

In S1603, it is determined whether the operation mode is M4. When the operation mode is M4 (Yes), the operation proceeds to S1604. In S1604, it is determined whether the timer exceeds the predetermined time t0, and the process is ended when the predetermined time t0 is not exceeded (No). When the predetermined time t0 is exceeded (Yes), the operation proceeds to S1605 to set the operation mode to M5, and the process is ended. When the operation mode is not M4 in the determination process S1603 (No), the operation proceeds to S1606.

In S1606, branch processing below is performed according to an elapsed time of the timer. The following time thresholds have a relationship of t0<t1<t2.

When the timer does not exceed the predetermined time t0 (timer t0), the process is ended.

When the timer corresponds to a time between the predetermined times t0 and t1 (t0<timer≤t1), the operation proceeds to S1609 to set the operation mode to M1, and the process is ended.

When the timer corresponds to a time between the predetermined times t1 and t2 (t1<timer≤t2), the operation proceeds to S1608 to set the operation mode to M2, and the process is ended.

When the timer exceeds the predetermined time t2 (timer>t2), the operation proceeds to S1607 to set the operation mode to M3, and the process is ended.

As described above, in Embodiment 3, the operation mode is switched to M0 to M5 according to the length of time during which the position within the predetermined distance r0 from the position where the cursor is moved is held. Then, it is possible to realize an operation such as click, double click or drag and drop using the mouse in the finger operation input mode by moving the cursor to a position distant by the predetermined distance r0 or more as a flick operation in the touch operation of the smartphone after the operation mode is switched. In addition, it is possible to confirm that the operation mode has been switched by changing the display of the cursor, and it is possible to easily perform the mouse operation intended by the user.

Embodiment 4

In Embodiment 4, a description will be given of the case of performing an input operation by three-dimensionally detecting a position of the finger of the user (hereinafter referred to as a 3D finger operation mode).

Figure 19:
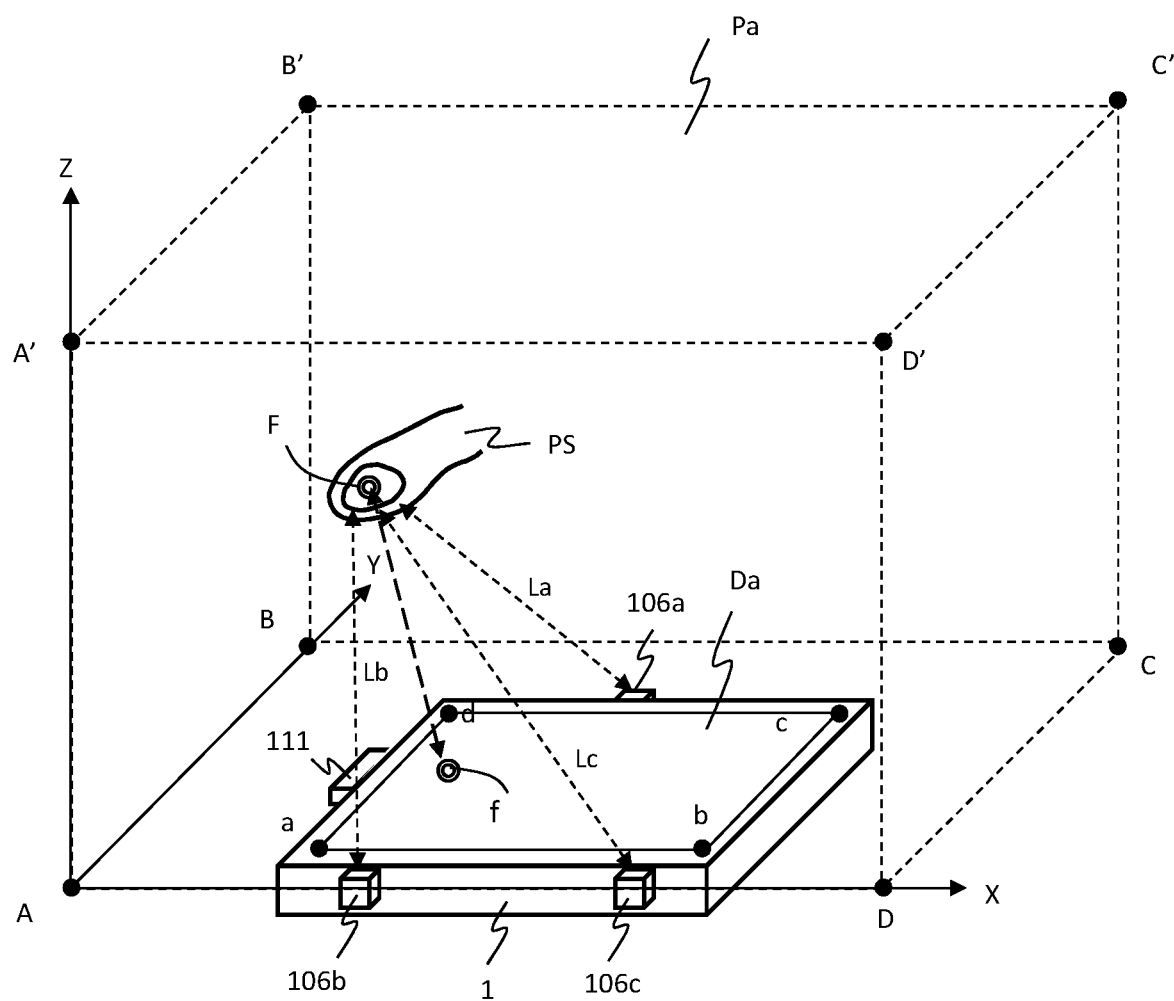
FIG. 19 is a diagram illustrating a principle of detection of a 3D finger operation mode (Embodiment 4).

FIG. 19 is a diagram illustrating a principle of detection of the 3D finger operation mode and illustrates a relationship between a position of the finger and a display position of the display unit. A position of the finger PS in a vertical direction (height Z axis direction) in addition to a parallel direction (XY axis direction) with respect to the display unit 109a of the input terminal device 1 is detected, and an input operation is performed. The figure illustrates a relationship between the detected position F of the finger (position input object) PS and the display position f of the display unit 109a.

Three finger position detection sensors 106a, 106b, and 106c are provided to three-dimensionally detect the finger position. For example, each of the sensors 106a to 106c includes an infrared light emitting element and a light receiving element, and signals of levels corresponding to distances La, Lb, and Lc to the finger PS are output from the respective sensors 106a to 106c. The finger position information acquisition unit 1022 acquires the position F of the finger PS in the position input detection range (space Pa) surrounded by the positions A-B-C-D-A'-B'-C'-D' on the basis of output signals from the respective sensors 106a to 106c. The position f in the display range Da surrounded by the positions a-b-c-d of the display unit 109a is determined according to a position in the XY axis direction of the acquired position F. For example, the cursor, etc. is displayed. Meanwhile, a plurality of display screens is switched as described below according to a position in the Z axis direction of the acquired position F.

Figure 20:
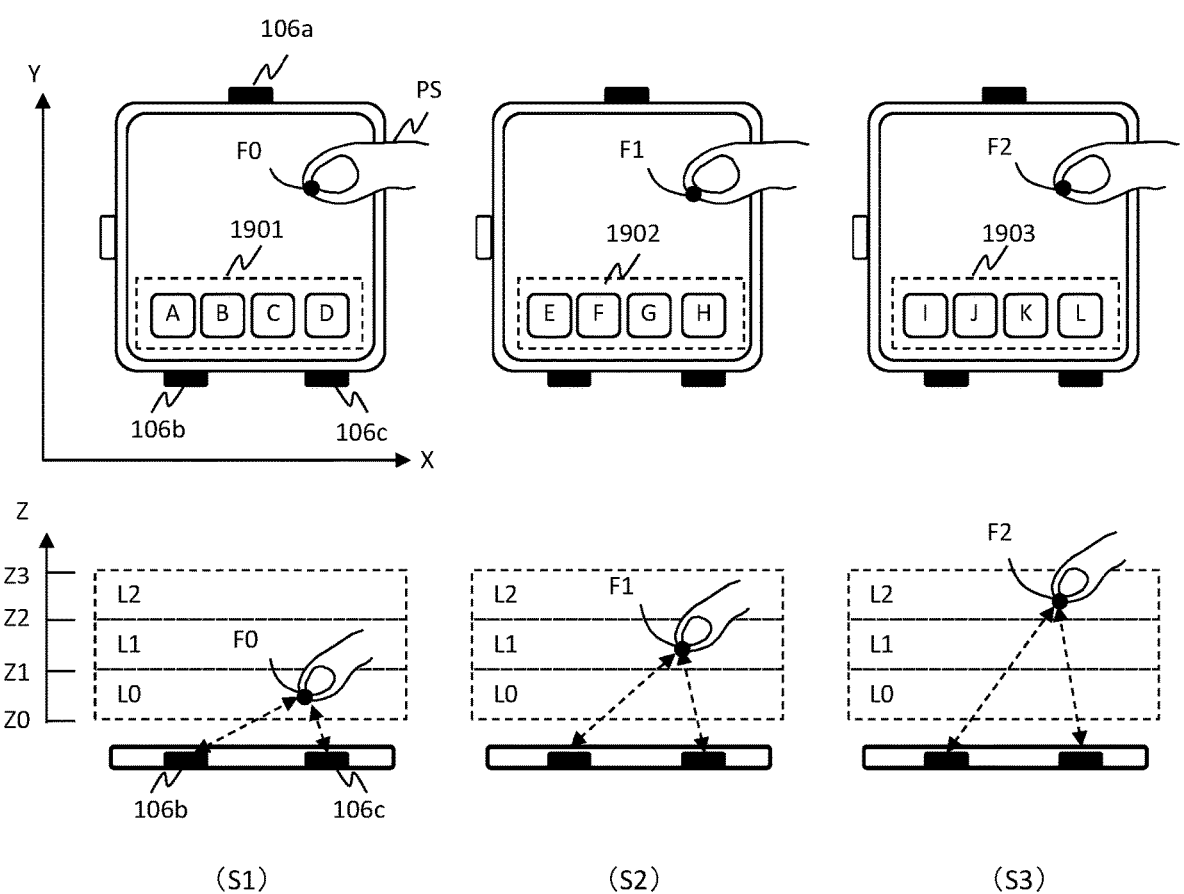
FIG. 20 is a diagram illustrating an example of screen display in the 3D finger operation mode.

FIG. 20 is a diagram illustrating an example of a screen display in the 3D finger operation mode. Here, a window screen (home screen), on which icons are disposed, is displayed as a screen for operation. A position in the height Z direction with respect to the display unit 109*a* is divided into a plurality of layers L0, L1, and L2 using Z0 to Z3 as boundaries. The window screen is switched and display depending on the layer in which the finger PS is located. A display state in each layer is shown in (S1) to (S3).

(S1): When a position F0 of the finger PS is in a range in a height direction Z0 to Z1 (layer L0), an icon group 1901 corresponding to the applications A to D is displayed on the window screen.

(S2): When a position F1 of the finger PS is in a range in a height direction Z1 to Z2 (layer L1), an icon group 1902 corresponding to the applications E to H is displayed on the window screen.

(S3): When a position F2 of the finger PS is in a range in a height direction Z2 to Z3 (layer L2), an icon group 1903 corresponding to the applications I to L is displayed on the window screen.

Thereafter, mouse operation input processing described in Embodiment 3 is executed. That is, an application is selected by clicking on a display icon, the application is executed by double clicking on the icon, and a display position of the icon is moved by dragging and dropping the icon.

In this way, according to the 3D finger operation mode, it is possible to switch a screen display for scanning for each of a plurality of layers, and thus it is possible to easily perform mouse operation input processing for a plurality of applications (icons).

Figure 21:
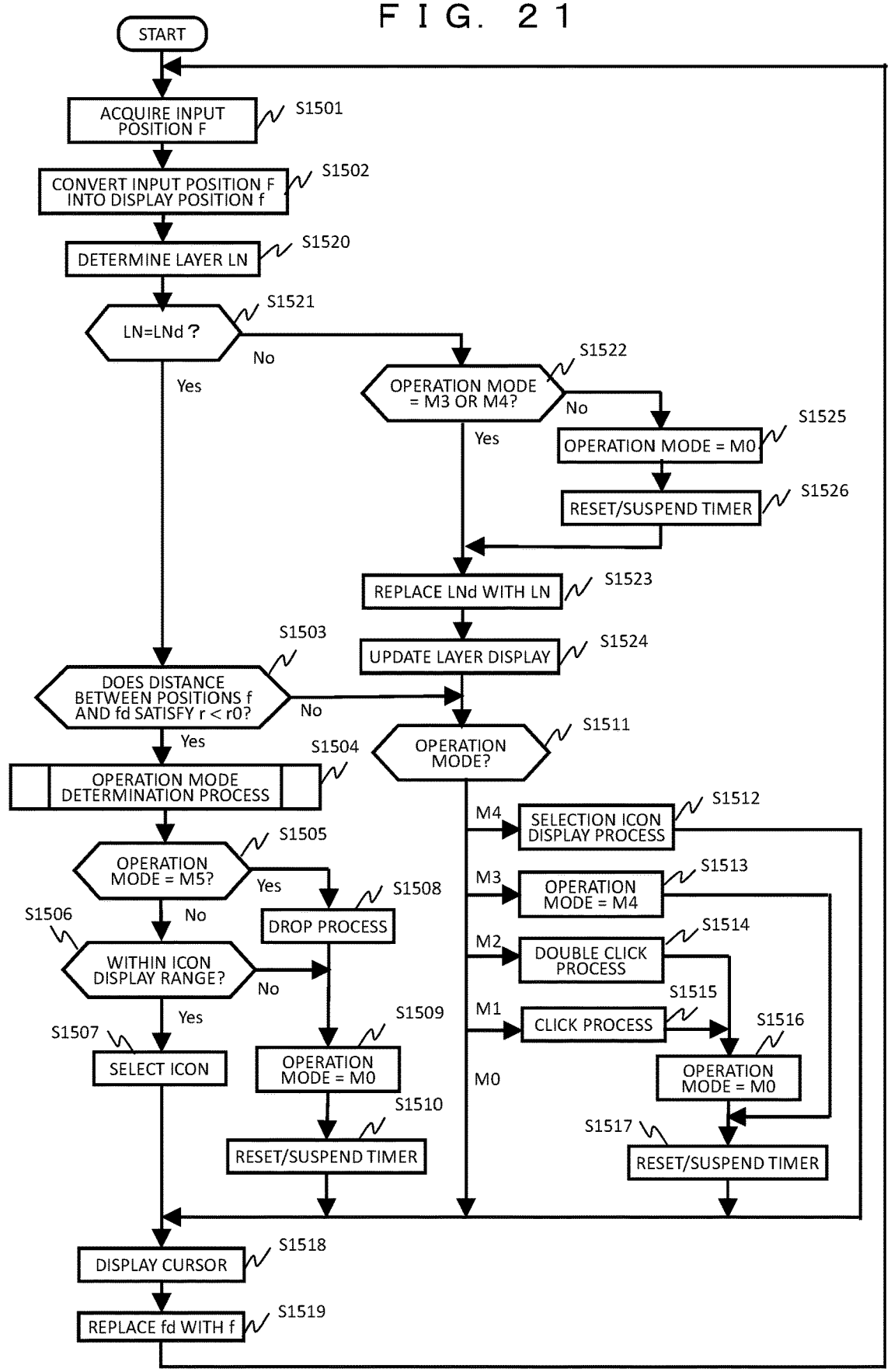
FIG. 21 is a flowchart illustrating mouse operation input processing in the 3D finger operation mode.

FIG. 21 is a flowchart illustrating mouse operation input processing in the 3D finger operation mode. The same reference symbol will be assigned to the same process as that of Embodiment 3 (FIG. 17), and repeated description will be omitted.

In S1501, a 3D position F of the finger PS is acquired by the finger position information acquisition unit 1022. In S1502, a position in the YX direction of the acquired position F is converted into the position f in the display range Da as illustrated in FIG. 19. Subsequently, in S1520, a layer having a range that includes the position in the Z direction of the acquired position F is determined. In S1521, it is determined whether a determined layer LN is the same as a previously determined layer LNd stored in the temporary storage area of the RAM 103. When the determined layer LN is the same as the previously determined layer LNd as a result of determination (Yes), the operation proceeds to S1503. Processes from S1503 are the same as those of FIG. 17, and thus a description thereof will be omitted. When the determined layer LN is different from the previously determined layer LNd as a result of determination (No), the operation proceeds to S1522.

In S1522, it is determined whether the operation mode is M3 or M4. The operation proceeds to S1523 when the operation mode is M3 or M4 (Yes), and the operation proceeds to S1525 when the operation mode is neither M3 nor M4 (No). In S1525, the operation mode is set to M0, and the operation proceeds to S1526. In S1526, the timer is reset/suspended, and the operation proceeds to S1523.

In S1523, the determined layer LN is replaced with the previously determined layer LNd and stored in the temporary storage area of the RAM 103, and the operation proceeds to S1524. In S1524, the screen of the display unit 109*a* is updated to display a window screen (home screen) corresponding to the determined layer LN, and the operation proceeds to S1511. Processes from S1511 correspond to mouse operation input processing according to each of the operation modes M0 to M4 and are the same as those of FIG. 17, and a description will be omitted.

As described above, when a 3D position of the finger of the user is detected to perform operation input, it is possible to perform division into a plurality of layers according to a position in the height Z direction and display a window screen (home screen) for operation corresponding to each layer. In addition, it is possible to perform mouse operation such as clicking, double clicking, dragging and dropping on the icon displayed in the window of each layer.

In the above example, icons corresponding to different applications for each of a plurality of layers are displayed on the window screen. However, the invention is not limited thereto, and it is possible to display the operation surface different for each layer.

For example, FIG. 22 is a diagram illustrating an example of screen display in key character input processing. In key character input processing, a keyboard of a different character type for each layer is displayed on the display unit.

(S1): When the position F0 of the finger PS is within the range of the layer L0, a keyboard for inputting alphabets and symbols is displayed.

(S2): When the position F1 is within the range of the layer L1, a keyboard for inputting hiragana is displayed.

(S3): When the position F2 is within the range of the layer L2, a keyboard for inputting numbers is displayed.

In this way, the user can easily change the input character type by changing the position of the finger PS in the height Z direction.

As described above, according to Embodiment 4, screen display or operation content may be switched for each of a plurality of layers in the 3D finger operation mode, and thus it is possible to easily realize various types of operations. The user may appropriately set the number of layers according to the type of operation to be used.

Embodiment 5

In Embodiment 5, a description will be given of a configuration in which a transition region is provided between layers to smoothly switch among a plurality of layers in the 3D finger operation mode.

FIG. 23 is a diagram illustrating an example of screen display in a case in which a transition region is provided between layers. The position of the finger PS in the height Z direction is divided into a plurality of layers L0 to L2, and layer transition regions T01 and T12 are provided at boundaries of the respective layers. Similarly to Embodiment 4, a different window screen for operation (here, icon group) is displayed according to each of the layers L0 to L2. However, in layer transition regions T01 and T12, a window screen corresponding to adjacent layers is displayed. Hereinafter, a change in screen display will be described along movement of the finger PS in the height direction.

First, a case in which the position of the finger PS is moved from F0 to F4 (that is, from the layer L0 to the layer L2) will be described in (S1) to (S5).

(S1): The position F0 of the finger PS is within a range of the layer L0, and an icon group 2101 corresponding to the applications A to D is displayed on the window screen.

(S2): When the position F1 of the finger PS moves to the layer transition region T01 between the layers L0 and L1, the window screen (icon group 2101) displayed in the immediately preceding layer L0 is continuously displayed. In this instance, a screen background is changed to a display 109T indicating a transition region.

(S3): The position F2 of the finger PS is within the range of the layer L1, and an icon group 2102 corresponding to the applications E to H is switched and displayed on the window screen.

(S4): When the position F3 of the finger PS moves to the layer transition region T12 between the layers L1 and L2, the window screen (icon group 2102) displayed in the immediately preceding layer L1 is continuously displayed. In this instance, the screen background is changed to the display 109T indicating the transition region.

(S5): The position F4 of the finger PS is within the range of the layer L2, and an icon group 2103 corresponding to the applications I to L is switched and displayed on the window screen.

Meanwhile, a case in which the position of the finger PS is moved from F4 to F0 (that is, from the layer L2 to the layer L0) will be described in (S5') to (S1').

(S5'): The position F4 of the finger PS is within the range of the layer L2, and the icon group 2103 corresponding to the applications I to L is displayed on the window screen.

(S4'): When the position F3 of the finger PS moves to the layer transition region T12 between the layers L1 and L2, the window screen (icon group 2103) displayed in the immediately preceding layer L2 is continuously displayed. In this instance, the screen background is changed to the display 109T indicating the transition region.

(S3'): The position F2 of the finger PS is within the range of the layer L1, and the icon group 2102 corresponding to the applications E to H is switched and displayed on the window screen.

(S2'): When the position F1 of the finger PS moves to the layer transition region T01 between the layers L0 and L1, the window screen (icon group 2102) displayed in the immediately preceding layer L1 is continuously displayed. In this instance, the screen background is changed to the display 109T indicating the transition region.

(S1'): The position F0 of the finger PS is within the range of the layer L0, and the icon group 2101 corresponding to the applications A to D is switched and displayed on the window screen.

As described above, when the finger PS is within the range of each layer, the window screen corresponding to each layer is displayed. Further, when the finger PS moves to the layer transition region, the window screen of the immediately preceding layer is continuously displayed, and a background thereof is changed and displayed.

As described above, a transition region is provided between respective layers, and the background of the window screen is changed when the finger PS moves to the transition region, so that the user is notified of moving to the transition region. In this instance, the immediately previously displayed window screen is continued without change, and thus there is no hindrance to the operation. As a result, it is possible to prevent the user from unintentionally moving to another layer. That is, when the background of the window screen changes, it is sufficient to move the finger PS in a direction of an original layer.

Figure 24:
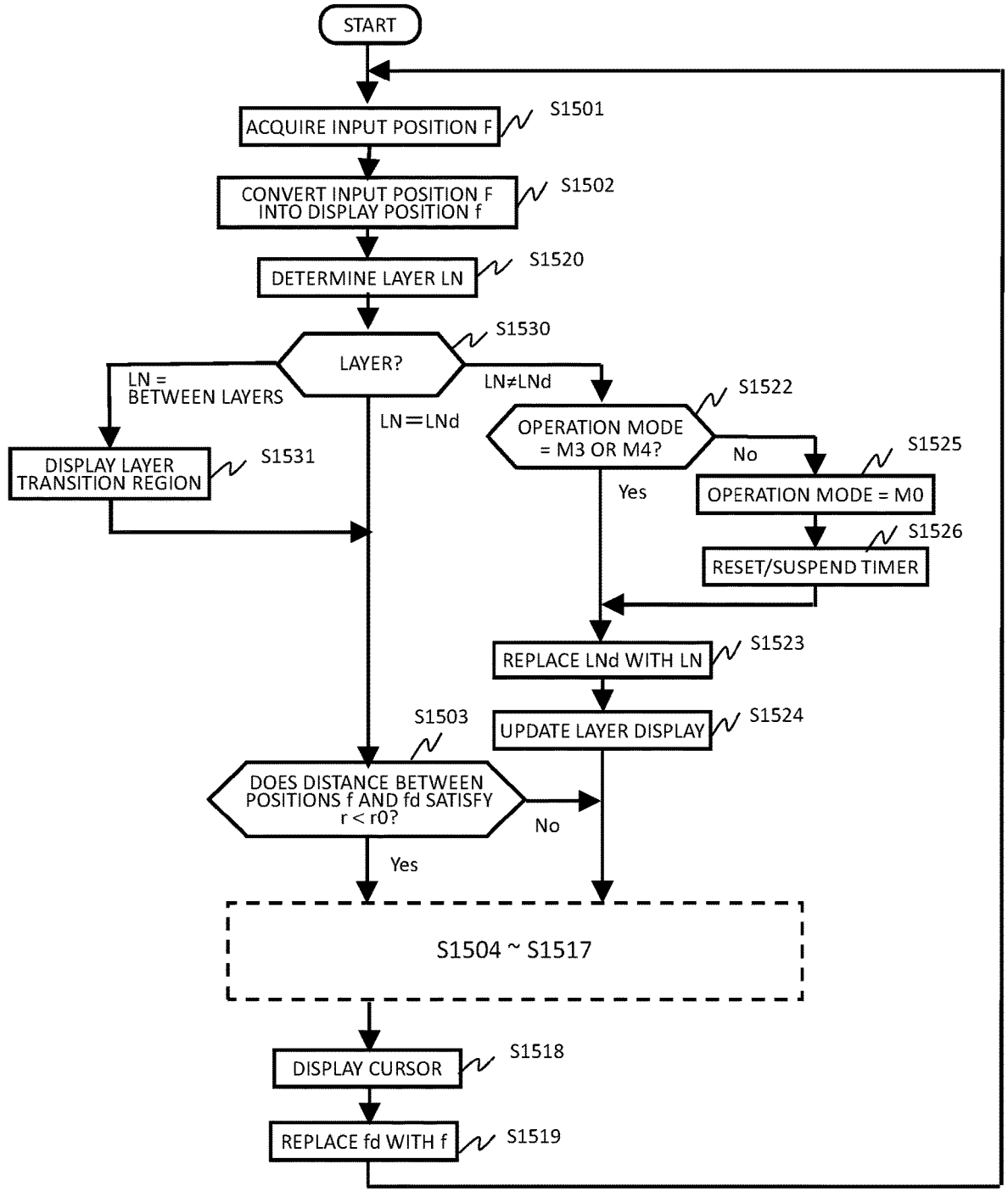
FIG. 24 is a flowchart illustrating mouse operation input processing in a case in which the transition region is provided between the layers.

FIG. 24 is a flowchart illustrating mouse operation input processing in a case in which the transition region is provided between the layers. The same reference symbol will be assigned to the same process as that in Embodiment 3 (FIG. 17) and Embodiment 4 (FIG. 21), and a repeated description will be omitted.

In S1501, a 3D position F of the finger PS is acquired. In S1502, a position in the XY direction of the position F is converted into the position f in the display range Da. Subsequently, in S1520, a layer having a range that includes the position in the Z direction of the position F is determined, or it is determined whether the position is within the layer transition region. In S1530, branch processing is performed depending on the layer determination result.

In the determination process S1530, when the determined layer LN is within the layer transition region (LN=between layers), the operation branches to S1531. In S1531, the background of the window display screen is set to the display 109T corresponding to the layer transition region, and the operation proceeds to S1503.

When the determined layer LN is the same as the previously determined layer LNd (LN LNd) in the determination process S1530, the operation proceeds to S1503. Processes from S1503 are the same as those of FIG. 17, and a description thereof will be omitted.

When the determined layer LN is different from the previously determined layer LNd (LN≠LNd) in the determination process S1530, the operation proceeds to S1522. Processes from S1522 are the same as those of FIG. 21, and a description thereof will be omitted.

As described above, according to Embodiment 5, in addition to detecting the 3D position of the finger PS and displaying a window corresponding to a plurality of layers corresponding to the position in the height direction Z, the transition region is provided between the layers. Further, when the finger PS moves to the transition region, the user is notified by changing the background of the window screen, which may prevent the user from unintentionally moving to another layer. As a result, it is possible to smoothly switch between layers.

In the present embodiment, the background of the window screen is changed when the finger PS moves to the layer transition region. However, the invention is not limited thereto. For example, it is possible to use a method recognizable by the user such as changing the display of the icon, changing the display of the cursor, generating sound or vibration, etc. In addition, at the time of being positioned in the transition region, the direction of the original layer (up/down) may be displayed.

In the above description of each embodiment, the example in which the finger position detection sensor 106 includes the light emitting/light receiving element is shown. However, the invention is not limited thereto, and it is possible to use a device capable of detecting a position of the position input object such as the finger of the user or the pen, for example, a sensor using an ultrasonic wave, an image pickup device such as a camera, etc. In addition, even though a wristwatch-type input terminal device has been described as an example, it is possible to input a handwritten character or operate the mouse by detecting the position of the position input object such as the finger of the user or the pen in a smartphone, a tablet computer, a personal computer, etc.

In addition, in each of the above-described embodiments, it is presumed that the position of the position input object such as the finger of the user on the display screen is held within a predetermined distance for a predetermined time or longer as a condition of a specific operation for switching the operation mode. However, the invention is not limited to this. For example, a case in which the amount of movement of the position on the display screen of the position input object within a predetermined time is within a predetermined distance may be set as a condition. Alternatively, a case in which a movement speed of the position on the display screen of the position input object is less than or equal to a predetermined speed may be set as a condition.

Even though the embodiments of the invention have been described using several embodiments, it goes without saying that the configuration for realizing the technique of the invention is not limited to the above-described embodiment, and various modified examples are conceivable. For example, a part of a configuration of a certain embodiment can be replaced by a configuration of another embodiment, and a configuration of a certain embodiment can be added to a configuration of another embodiment. All of these modifications are within the scope of the invention. In addition, numerical values, messages, etc. appearing in sentences and figures are merely examples, and even if different ones are used, the effect of the invention is not impaired. In addition, programs described in the respective processing examples may be independent programs, or a plurality of programs may be included in one application program. In addition, the order of performing each processing may be changed and executed.

Functions, etc. of the invention described above may be realized using hardware by designing some or all of the functions, etc. using, for example, an integrated circuit. Alternatively, the functions, etc. may be realized using software by a microprocessor unit, etc. interpreting and executing an operation program that realizes the respective functions, etc. Hardware and software may be used in combination.

In addition, control lines and information lines shown in the drawings indicate what is considered to be necessary for description and do not necessarily indicate all control lines and information lines on a product. In practice, it can be considered that almost all the structures are mutually connected.

REFERENCE SIGNS LIST

1: input terminal device, 2: mobile information terminal, 101: main controller, 102: ROM, 103: RAM, 104: storage unit, 105: acceleration sensor, 106, 106a, 106b, 106c: finger position detection sensor, 108: display controller, 109: touch panel, 109a: display unit, 109b: touch operation input unit, 110: clocking unit, 111: operation input unit, 1022: finger position information acquisition unit, 1023: touch position information acquisition unit, 1024: finger operation processing control unit, 1025: touch operation processing control unit, PS: finger of user (position input object).

The invention claimed is:

1. An input terminal device for inputting an operation of a user through a position input object, the input terminal device comprising:
a position detector that detects a position of the position input object on a z-axis, operated by the user without contact;
a display that displays a cursor on the basis of a position detected by the position detector; and
an operation processing controller that executes a corresponding operation process on the basis of the position detected by the position detector,
wherein the operation processing controller has a plurality of operation modes related to execution of the operation process, and one of the operation modes has a state in which only movement of the cursor is executed according to the position of the position input object,
wherein the operation processing controller switches between the plurality of operation modes according to a length of time during which the position of the position input object is held within a predetermined range on the z-axis without contact, and
wherein the operation processing controller changes a shape and/or a color of the cursor displayed on the display depending on the operation modes.

2. The input terminal device according to claim 1, wherein the plurality of operation modes includes a first operation mode in which movement and drawing of the cursor on the display are performed according to movement of the position detected by the position detector and a second operation mode in which movement of the cursor on the display is performed only according to movement of the position detected by the position detector.

3. The input terminal device according to claim 1, wherein the operation processing controller displays a process instruction button on the display, and executes a process corresponding to the process instruction button when a position of the cursor is held at a position at which the process instruction button is displayed within a predetermined range for a predetermined time or more.

4. The input terminal device according to claim 1, wherein the operation processing controller executes a mouse operation process corresponding to the operation modes when a position of the position input object moves within a predetermined range or more.

5. The input terminal device according to claim 1,
wherein the position detector detects a position of the position input object in a parallel direction and a vertical direction with respect to the display, and
the operation processing controller divides a position in the parallel direction with respect to the display into a plurality of layers, and switches a screen for operation displayed on the display according to one of the plurality of layers having a range that includes the position of the position input object detected by the position detector.

6. The input terminal device according to claim 5,
wherein the operation processing controller further sets a transition region at a boundary between the plurality of layers, and
when the position of the position input object is within the transition region, an immediately previously displayed screen for operation is continuously displayed on the display, and a background of the screen is changed.

7. An operation input method of inputting an operation of a user through a position input object, the operation input method comprising:
a position detection step of detecting a position of the position input object on a z-axis operated by the user without contact;
a display step of displaying a cursor on a display on the basis of the position detected in the position detection step; and
an operation process step of executing a corresponding operation process on the basis of the position detected in the position detection step,
wherein the operation process step has a plurality of operation modes related to execution of the operation process, and one of the operation modes has a state in which only movement of the cursor is executed according to the position of the position input object,
wherein the operation process step switches between the plurality of operation modes according to a length of time during which the position of the position input object is held within a predetermined range on the z-axis without contact, and
wherein in the operation process step, a shape and/or a color of the cursor displayed on the display is changed depending on the operation modes.

8. The operation input method according to claim 7, wherein the plurality of operation modes includes a first operation mode in which movement and drawing of the cursor on the display are performed according to movement of the position detected in the position detection step and a second operation mode in which movement of the cursor on the display is performed only according to movement of the position detected by the position detection step.

* * * * *